Aug. 29, 1961 F. P. HOPFELD 2,997,721
OVER-HEAD SERVICE AND CLEANING APPARATUS
Filed June 8, 1959 9 Sheets-Sheet 1

Inventor
Fred P. Hopfeld
By Wallace and Cannon
Attorneys

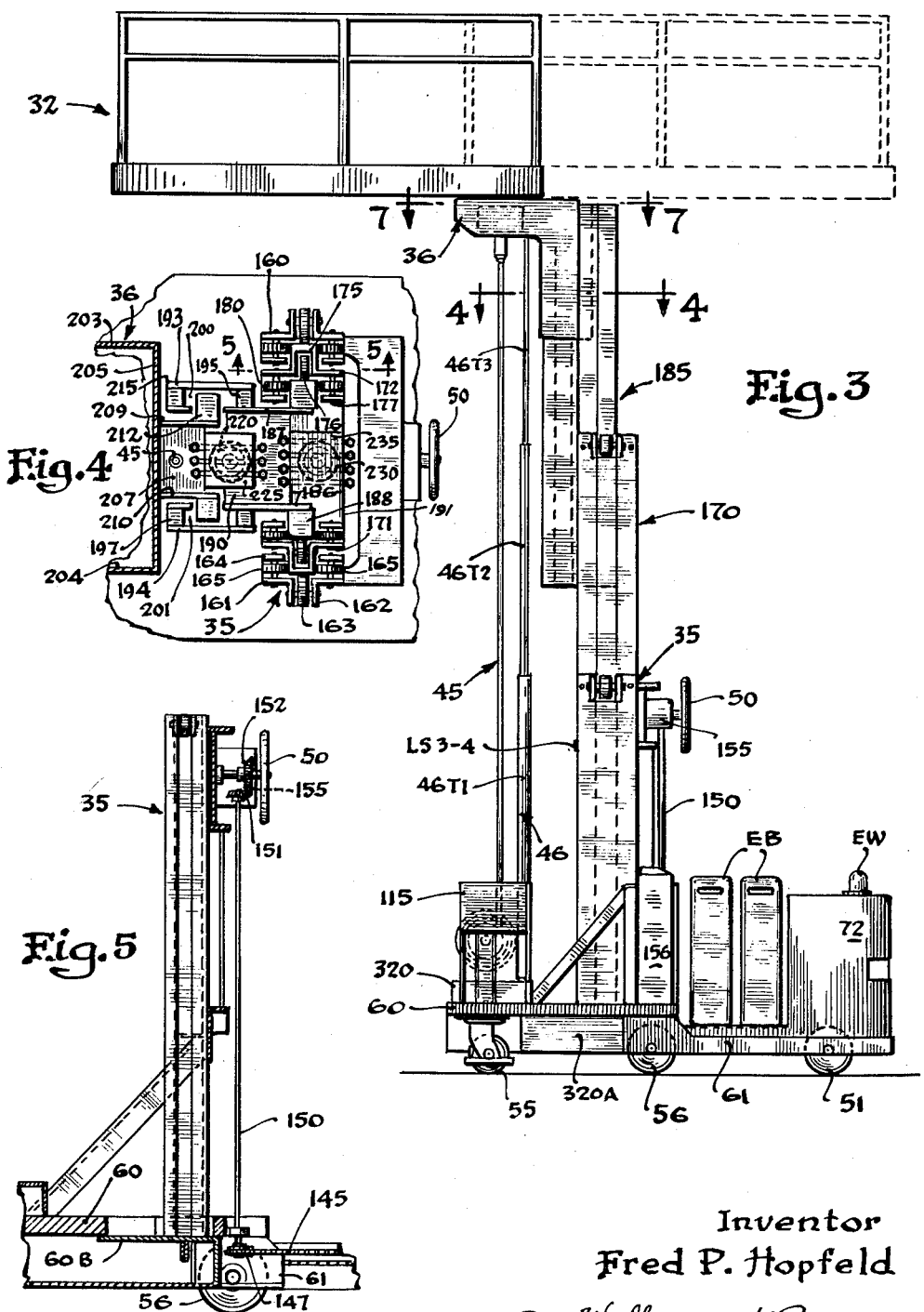

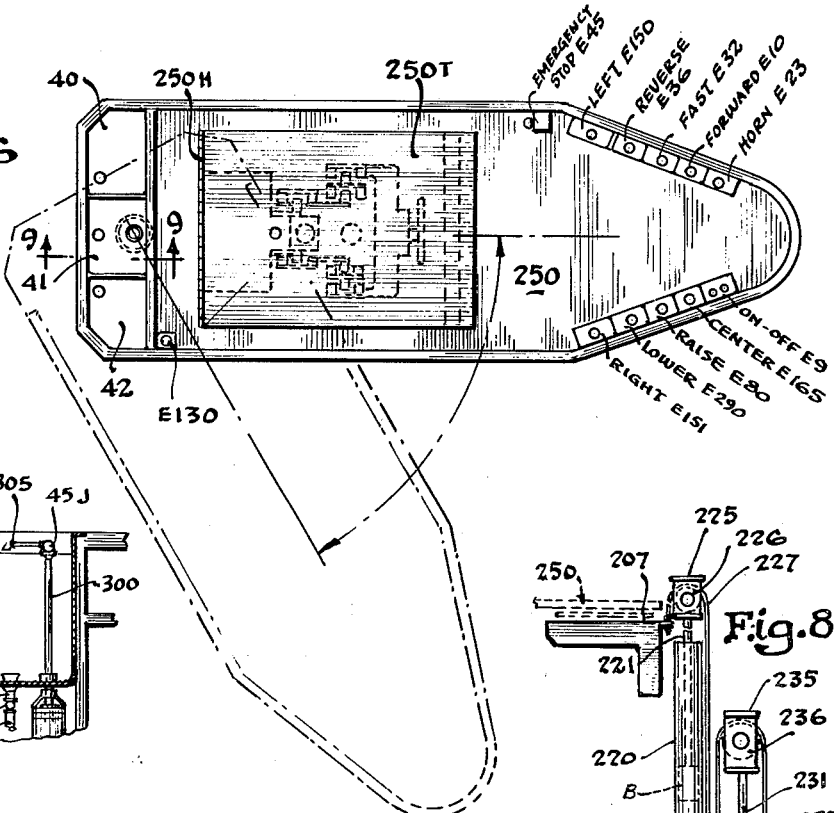
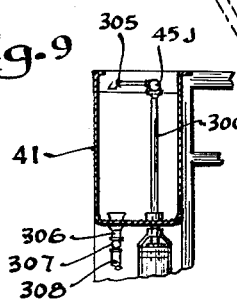
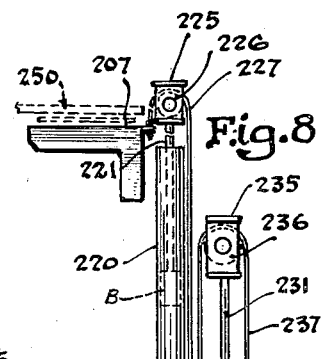
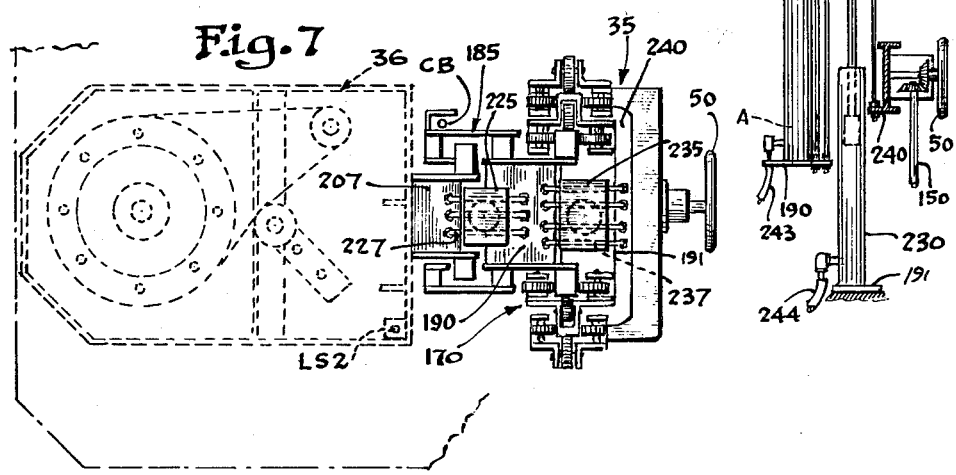

Aug. 29, 1961 F. P. HOPFELD 2,997,721
OVER-HEAD SERVICE AND CLEANING APPARATUS
Filed June 8, 1959 9 Sheets-Sheet 4
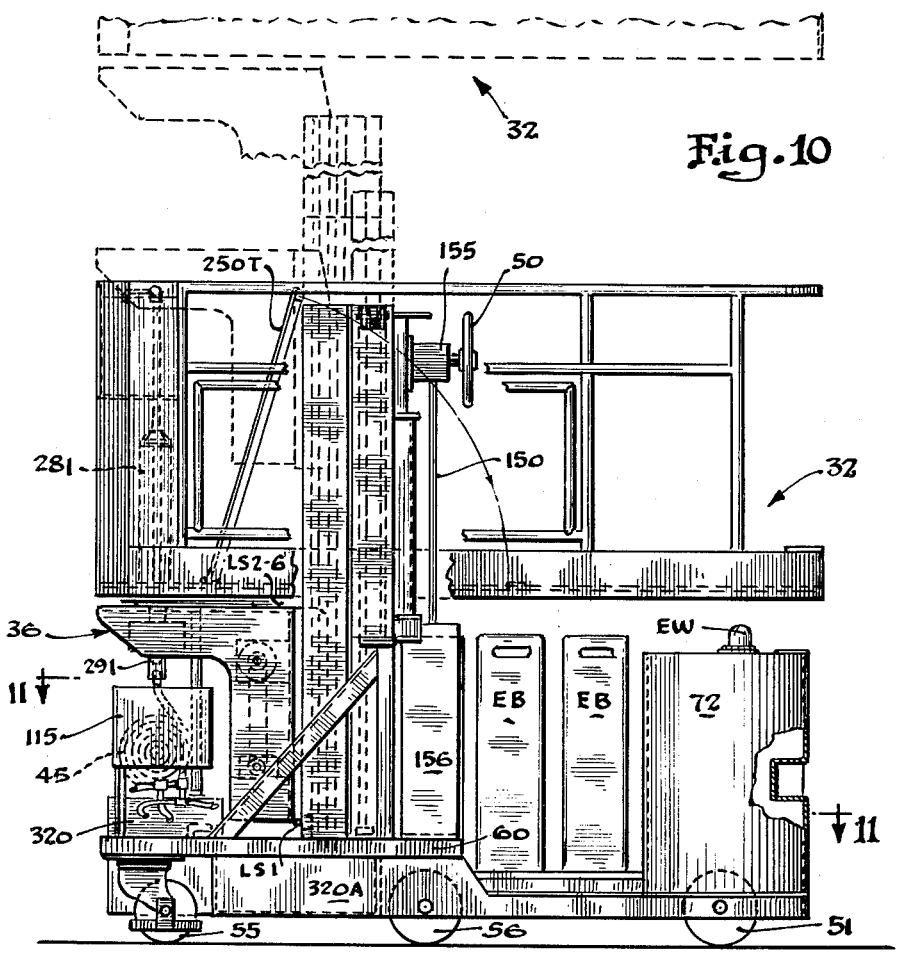
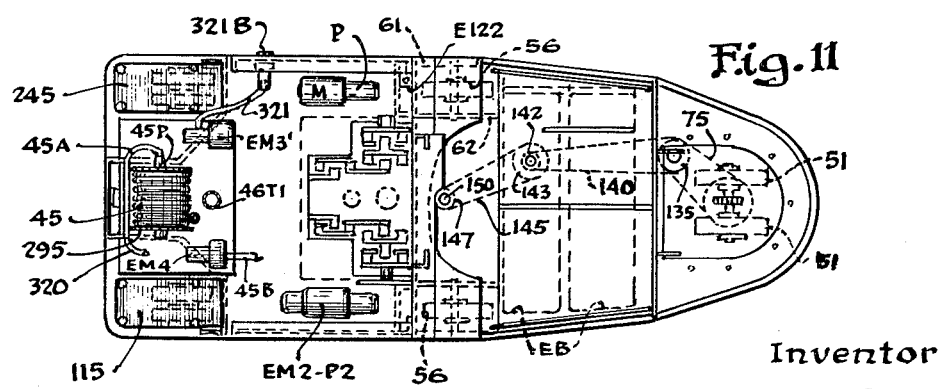
Inventor
Fred P. Hopfeld
By Wallace and Cannon
Attorneys Aug. 29, 1961 F. P. HOPFELD 2,997,721
OVER-HEAD SERVICE AND CLEANING APPARATUS
Filed June 8, 1959 9 Sheets-Sheet 5
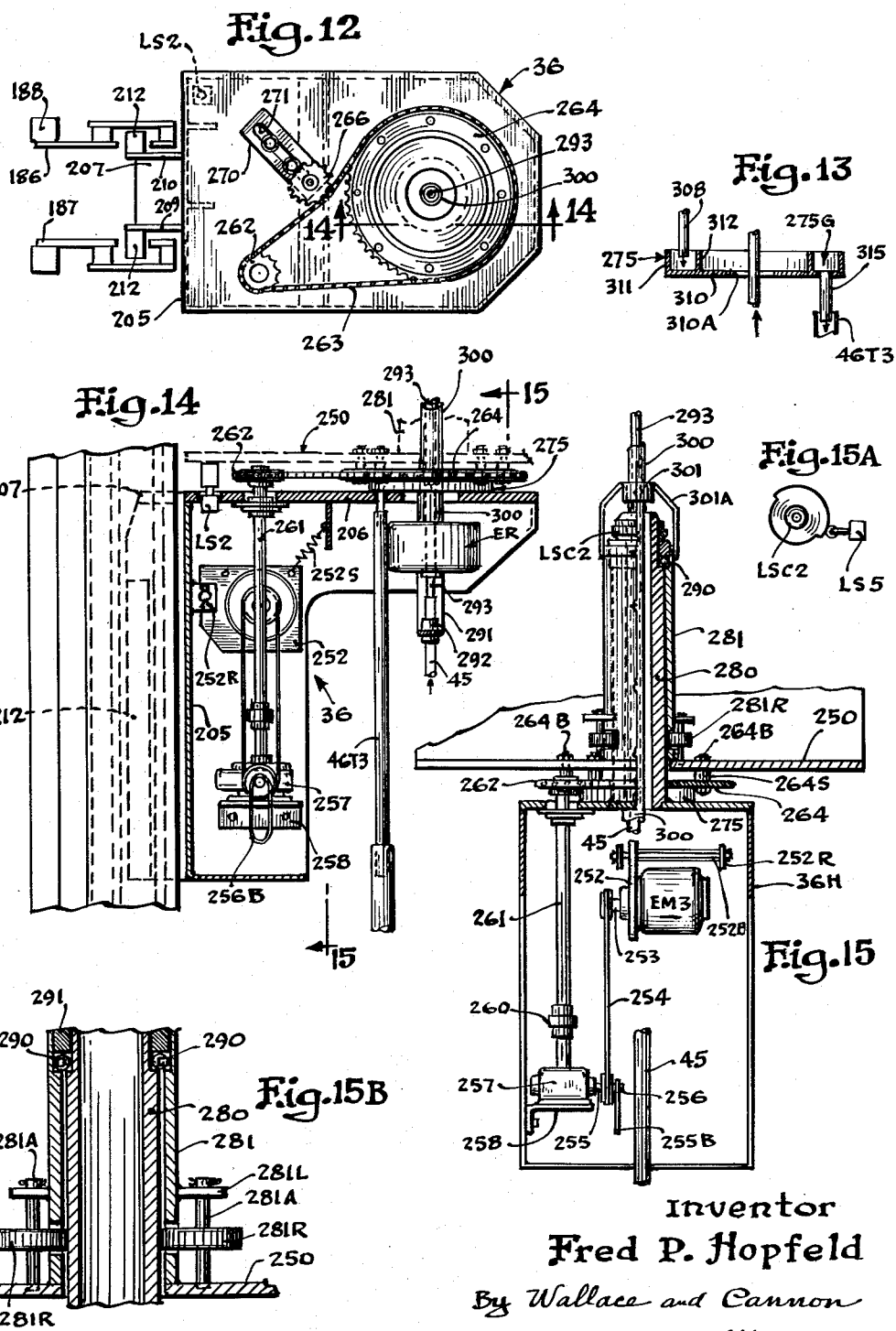
Inventor
Fred P. Hopfeld
By Wallace and Cannon
Attorneys Aug. 29, 1961 F. P. HOPFELD 2,997,721
OVER-HEAD SERVICE AND CLEANING APPARATUS
Filed June 8, 1959 9 Sheets-Sheet 6
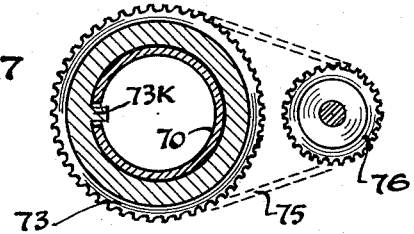
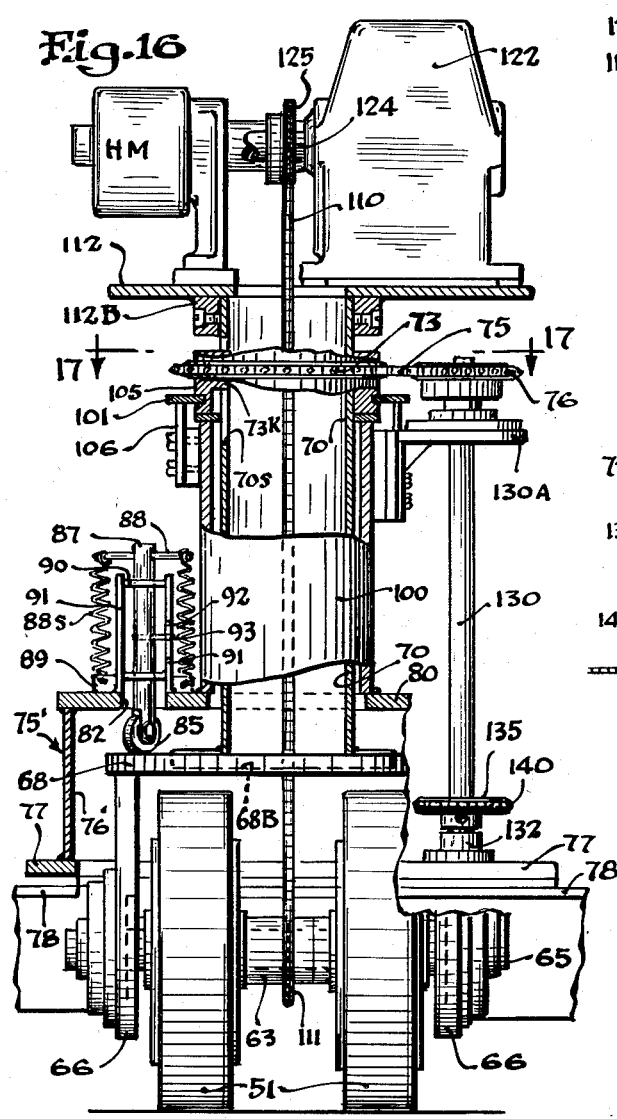
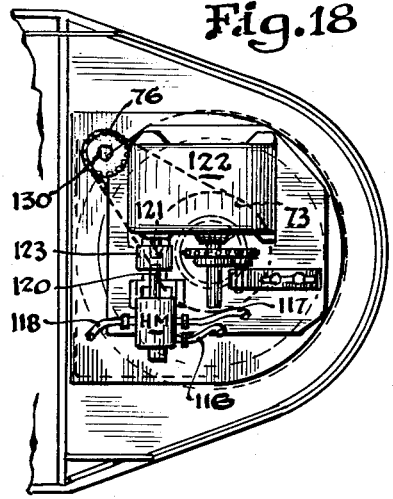
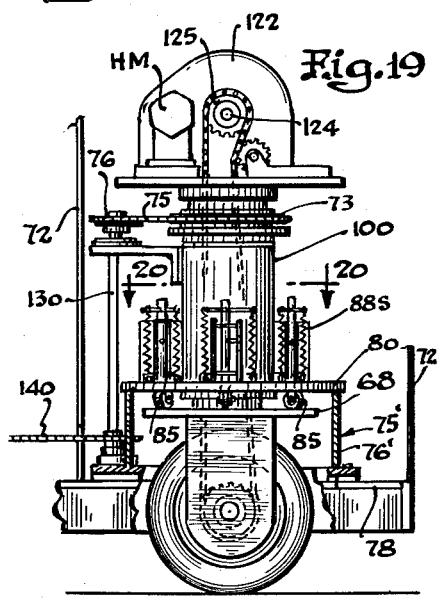
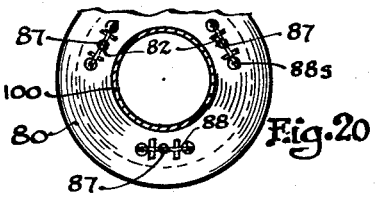
Inventor
Fred P. Hopfeld
By Wallace and Cannon
Attorneys Aug. 29, 1961     F. P. HOPFELD     2,997,721
OVER-HEAD SERVICE AND CLEANING APPARATUS
Filed June 8, 1959     9 Sheets-Sheet 7

Inventor
Fred P. Hopfeld
By *Wallace and Cannon*
Attorneys

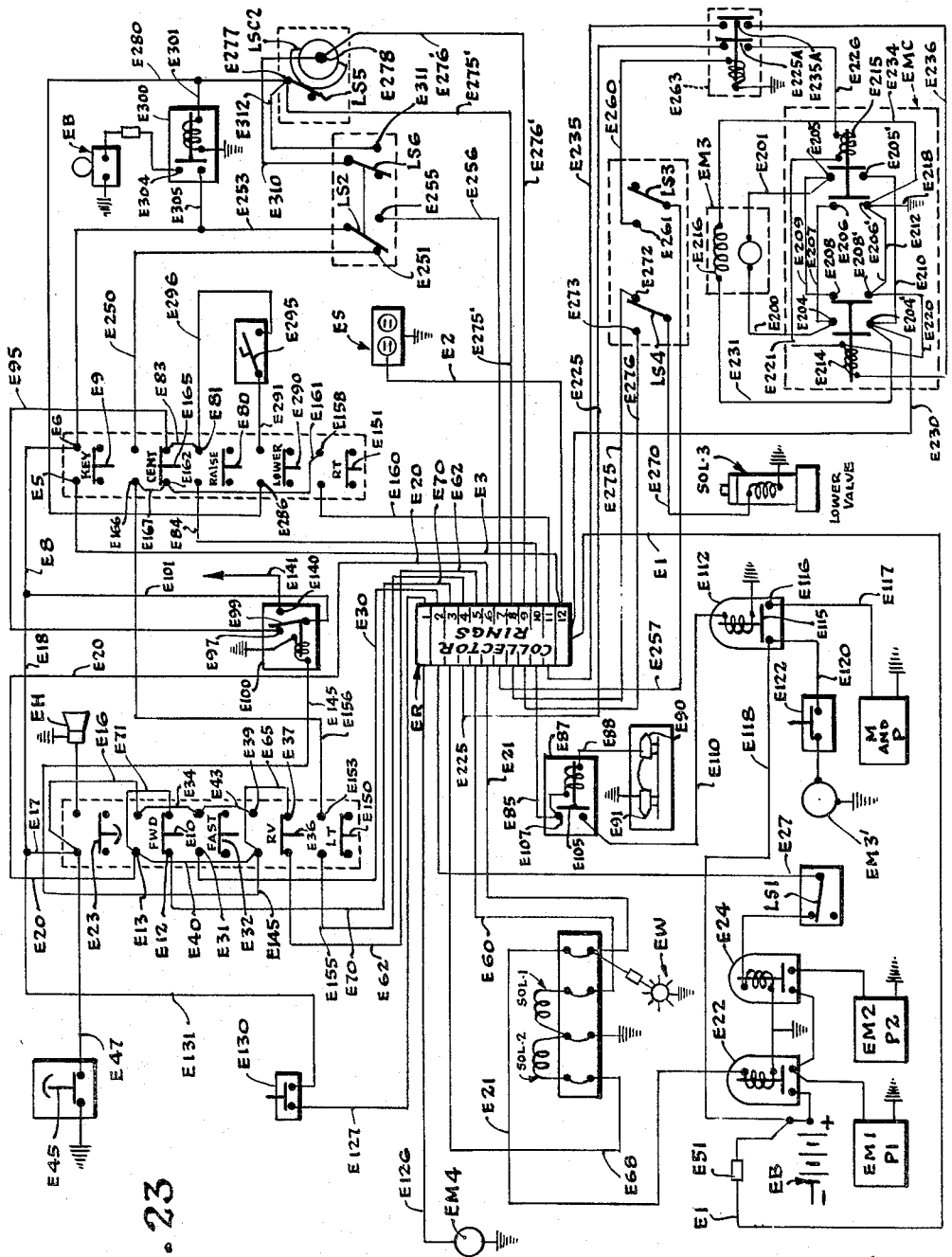

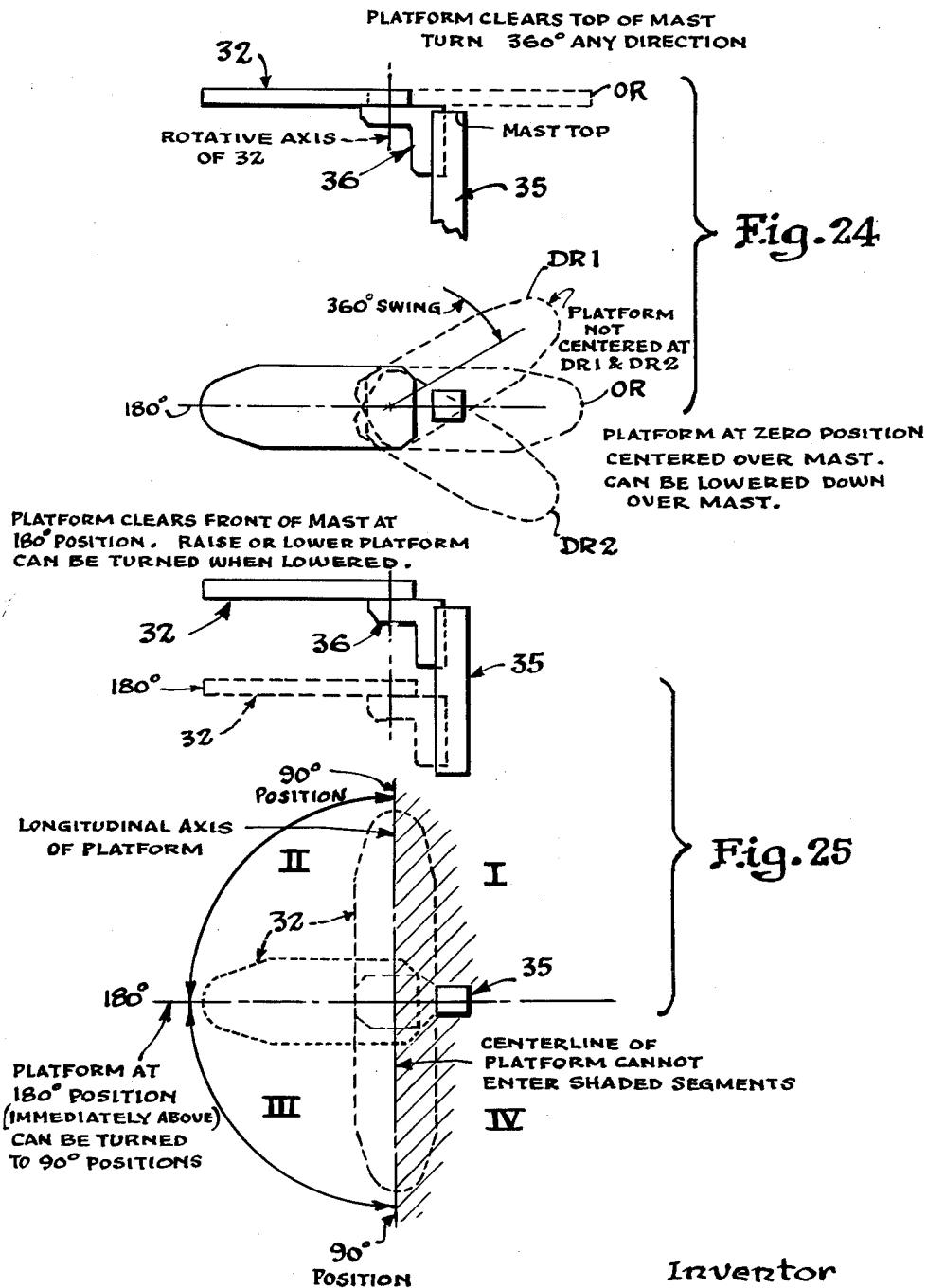

United States Patent Office 2,997,721
Patented Aug. 29, 1961

2,997,721
OVER-HEAD SERVICE AND CLEANING APPARATUS
Fred P. Hopfeld, Elmwood Park, Ill., assignor to Grand Specialties Corporation, Chicago, Ill., a corporation of Illinois
Filed June 8, 1959, Ser. No. 818,957
23 Claims. (Cl. 4—170)

This invention relates to an over-head service vehicle enabling cleaning operations, light repair work and the like to be performed at elevated positions.

There are numerous circumstances where cleaning operations and light repair work such as fixture replacement and so on need to be carried out at substantially elevated positions above floor level, and it has heretofore been proposed to facilitate these operations by providing a safe, sturdy elevatable platform on a stabilized mobile base. Such vehicles as heretofore constructed have usually been quite large and have not had a sufficiently short turning radius to enable the same to be conveniently used in plants or other establishments where the aisles are quite narrow and where sharp turns are necessary. Moreover, such vehicles as heretofore constructed have usually had the platform elevating mechanism arranged at projecting angles which limit the space within which turning of the unit can be accomplished and which in fact tend to cause accidents due to the extensively projecting parts. Additionally, the elevatable platform on which the workman is to stand has not been so located or mounted as to be capable of non-projecting juxtaposed position over the mobile base of the vehicle when the platform is fully lowered, or capable of movement throughout a wide area when in an elevated position. These draw-backs present serious limitations, and one of the primary objects of the present invention is to overcome these limitations by arranging a cantilevered platform for 360° turning through a wide area, making provision for a nested state of the platform in non-laterally projecting state over the top of a mobile base when the unit is not in use, and making provision for use of the vehicle in limited area-ways.

In such vehicles, it is of course essential that the workman have fresh water available at the elevated work position, but heretofore this has usually been accomplished merely by providing a limited supply to a tank or receiver on the platform prior to elevating the platform. When this supply is used, it is necessary to lower the platform to obtain a fresh supply.

In view of the foregoing, another primary object of the present invention is to so construct an over-head supply vehicle as to enable fresh water to be pumped to a sink in the platform and to enable used or dirty water to be drained from the sink irrespective of the particular height to which the platform may be elevated, and irrespective of the position of the platform on a 360° turning arc which is possible under the construction according to the present invention. Thus, the vehicle under the present invention is so constructed as to have a platform capable of a 360° turning movement in an elevated position, and the supply and drain lines are so arranged and supported as to make it possible to utilize these lines irrespective of the height to which the platform has been elevated and irrespective of the location of the platform on its turning path.

A further object of the present invention is to enable the vehicle to be conveniently powered and easily steered. Consequently, the vehicle of the present invention can be moved down narrow lanes, aisles and corridors and turned in narrow spaces, especially in view of the fully nested relation obtainable between the platform and the base, and in this connection another object of the present invention is to enable an over-head service vehicle to be turned 360° substantially about its own center whereby the turn radius is as short as possible.

Another object of the present invention is to support a platform of the kind involved for vertical up and down movement by having resort to a substantially upright stationary mast secured to the mobile base of the vehicle and to enable the platform to be telescoped straight down over this mast in a nested relationship. As a consequence, the platform can be juxtaposed over the base in a centered position with respect to the base, and hence the vehicle can be used in and turned about narrow spaces not heretofore possible with over-head service vehicles of the kind involved. From this nested or parked position, the platform can be raised without clearing the top of the mast, or the platform can be elevated to substantial heights well above the top of the mast by means of vertically operating lifter elements which are supported and guided by the mast and which can be actuated to an extended position.

Another object of the present invention is to support the platform in a cantilevered relation on a non-rotatable lift head, since so to do enables the platform to be turned through a wide 360° circle thereby enabling the worker to perform services throughout a rather extensive area without having to move the base. A still further object of the present invention is to so arrange the platform relative to the lift head for turning motion as to enable the platform to be lowered or raised on either side of the mast, and in particular to enable at least 180° turning movement of the platform to be accomplished when the platform is at the side of the mast where the lift head is located and even though the platform does not clear the top of the mast.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 3 is a side elevation and showing the platform in a fully elevated position;

FIG. 4 is a sectional view taken substantially on the line 4—4 of FIG. 3;

FIG. 5 is a fragmentary elevation, partly in section, showing part of the steering means and aspects of frame construction;

FIG. 6 is a top plan view of the platform and illustrating the location of certain controls and other parts carried by the platform;

FIG. 7 is a sectional view taken substantially on the line 7—7 of FIG. 3;

FIG. 8 is a partly schematic view illustrating the nature of the extensible lift means utilized under the present invention;

FIG. 9 is a detailed sectional view showing the nature of the water outlet as it is related to the water sinks carried by the platform;

FIG. 10 is a side elevation of the vehicle with the platform lowered all the way down in a parked position over the mast;

FIG. 11 is a view taken substantially on the line 11—11 of FIG. 10;

FIG. 12 is a detailed plan view showing parts associated with the lift head;

FIG. 13 is a detailed sectional view showing part of the drain system for dirty water;

FIG. 14 is a detailed sectional view taken substantially on the line 14—14 of FIG. 12;

FIG. 15 is a sectional view taken substantially on the line 15—15 of FIG. 14;

FIG. 15A is a detailed view showing the relationship between a limit switch and its cam controller;

FIG. 15B is an enlarged view showing more detail of certain parts associated with the structure illustrated in FIG. 15;

FIG. 16 is a fragmentary view on an enlarged scale illustrating the means used to drive the vehicle;

FIG. 17 is a view taken substantially on the line 17—17 of FIG. 16;

FIG. 18 is a plan view of the parts shown in FIG. 16 but on a slightly reduced scale;

FIG. 19 is a view substantially at 90° to FIG. 16 and further illustrating details of the drive and steering mechanism;

FIG. 20 is a fragmentary view taken on the line 20—20 of FIG. 19;

FIG. 23 is a wiring diagram showing the electrical control circuitry;

FIG. 24 is a diagrammatic view illustrating platform turning motion when the platform clears the top of the mast; and FIG. 25 is a diagrammatic view illustrating movements possible with the platform at one side of the mast.

INTRODUCTION

Figure 1:
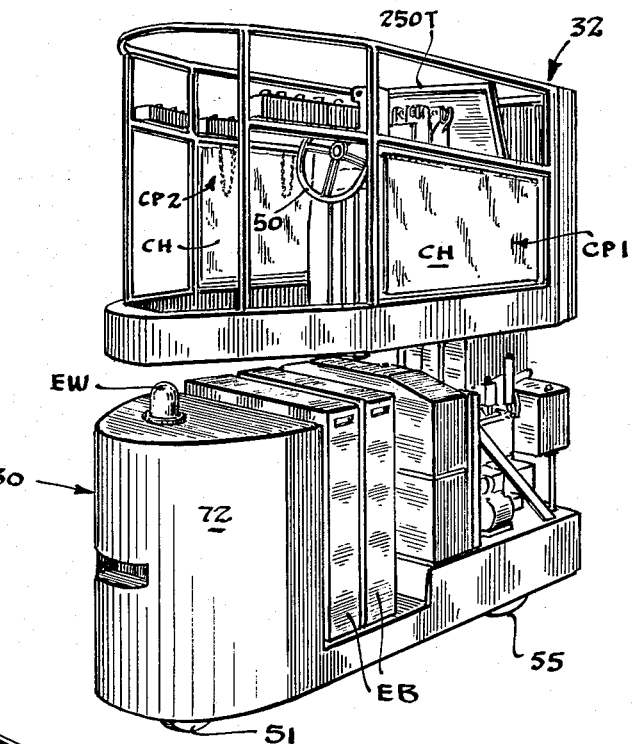
FIGS. 1 and 2 are perspective views of the vehicle of the present invention, FIG. 1 showing the platform fully lowered in a parked position and FIG. 2 showing the platform partly elevated to clear the top of the mast.
Figure 2:
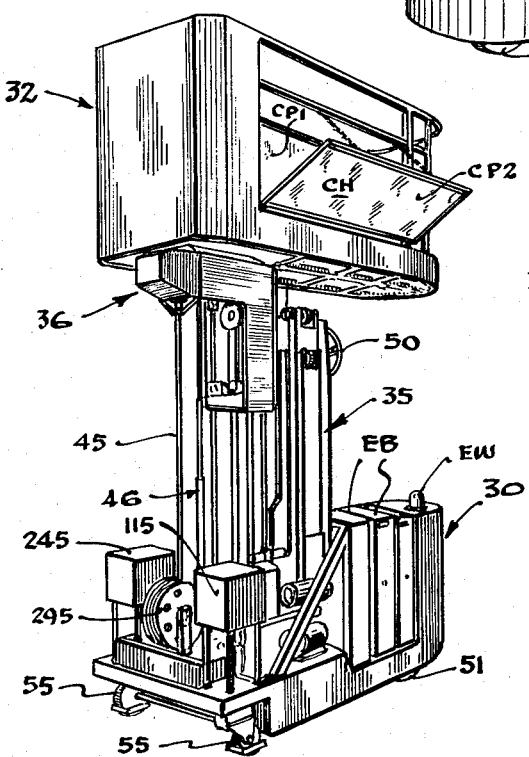

FIGS. 1 and 2 are perspective views illustrating the vehicle of the present invention in its over-all aspects as including a mobile and steerable base 30 and an elevatable working platform 32 associated therewith. The vehicle as illustrated in FIG. 1 has the platform in what can be termed a fully lowered and parked position four feet above floor level, and under such circumstances it will be noted that for all practical purposes no part of the platform projects outward of any side or parts associated with the base 30. Under this condition, the vehicle can be advantageously moved at a fast speed and steered in rather narrow or confining spaces in contrast to many constructions heretofore afforded wherein it has not been possible to have an elevatable platform so nested or juxtaposed in a parked position relative to the mobile base with which it is associated. As will be explained, the base 30 is to be driven by a hydraulic motor, and the steering arrangement and the wheels for the base are such as to enable the base to be turned 360° on its own center as viewed in FIG. 1. The entire unit can fit in an eight foot storage space and can be turned from a four and one-half foot aisle at right angles into a four and one-half foot aisle.

Referring to FIG. 2, it will be noted that the platform 32, in comparison to FIG. 1, has been raised somewhat and under this condition the platform has been moved upward to such an extent above the base 30 as to be clear or free of the top of the main support mast 35 which is anchored to the base in an upright disposition as will be explained in more detail hereinafter. Thus, the platform clears the mast at an eight foot level above the floor, and under this condition, the platform 32 can be turned through 360° thereby enabling a worker on the platform to work in any area within the sweep of the platform without having to produce motion of the base 30, and this sweep is a wide one due to the fact that the platform is carried in a cantilevered relation by a lift head 36. The lift head in turn is adapted to be raised and lowered by lift means associated with the mast as will be described hereinafter. Thus, the platform is supported on the lift head for rotation about a vertical axis eccentric to the mast. The remote or outer point of the platform is removed six feet-six inches from the rotative axis, thereby affording a thirteen foot sweep for the platform when free to turn through 360°. Referring to FIG. 3, it will be noted that the lift head 36 is disposed at one side of the mast 35, noting that in FIG. 3 the platform is shown as raised to an even greater height in comparison to FIG. 2, a maximum height being fifteen feet representing approximately a twenty-two foot reach for the operator. Moreover, in FIG. 3, the platform has been turned 180° in comparison to the position of the platform in FIG. 2. Under such condition, that is, with the platform 32 wholly disposed at that side of the mast where the lift head 36 is located, the platform can be lowered to its lower-most four-foot position mentioned and can be turned through substantially 180° of arc even though thus disposed below the top of the mast, thereby greatly enhancing the utility of the unit.

The foregoing briefly explains the general nature of platform movements possible under the present construction, and further details will be explained hereinbelow. In considering the over-all aspects of the present vehicle, it should be pointed out that the platform is equipped with three basins or sinks 40, 41 and 42, FIG. 6, each of which can be furnished with clean water from a swivel outlet spout, and each of which has its own drain enabling dirty water to be drained therefrom irrespective of the height of the platform and irrespective of the location of the platform on its turning circle. This is made possible under the present invention by extensible fresh water supply and used water drain lines 45 and 46, respectively, FIG. 3, arranged in such a manner that these lines will freely extend during elevation of the platform and freely collapse during lowering of the platform. The fresh water line is preferably in the form of a hose which is on a reel carried by the base, and fresh water can be pumped therethrough up to the aforesaid water outlet for the sinks. On the other hand, the drain line is a straight tube having telescoped sections, and by having resort to such construction for the drain line, a quick gravity drop for dirty water is assured thereby virtually eliminating the possibility of any collection of stagnant water or slow drain.

Fresh water is supplied from a thirty gallon fresh water tank at the base of the unit as will be described, and dirty water drains into a thirty gallon receiver on the base which has a pump associated therewith for relieving the receiver of its store of dirty water. The supply and drain lines 45 and 46 are extended to the lift head 36 and are so associated therewith as to enable the platform 32 to be turned without in any way twisting these lines. It will be appreciated that the term "water" is used herein as generic to any kind of cleaning fluid.

The vehicle is steered by a steering wheel 50 which is located on the side of the mast 35 opposite the lift head 36 as will be particularly evident in FIG. 3. In steering the vehicle, the operator stands on the floor of the "parked" platform and faces away from the steering wheel in the manner of operating a boat tiller. The operator can steer with one hand and with the other hand can operate those control switches (E36, E23, and so on, FIG. 6) which can be effectively used when the vehicle is moving to reverse, blow the horn and so on. It will be noted that these control switches are on control panels at the end of the platform opposite the sinks or basins described above. Others of these control switches such as E150, E290 and so on can be effectively used only when the platform is elevated, to turn the platform, lower the platform and so on. These and other controls will be described below in connection with FIGS. 21 and 23. All electrical power requirements are furnished by a 24-volt battery EB. Details of mechanical construction and arrangement of parts will now be described.

MECHANICAL DETAILS

The vehicle is steered by a steering wheel 50, FIGS. 1, 2 and 3, which is located at the side of the mast opposite the lift head 36. Directional turning movements of the steering wheel 50 are transmitted to steerable base supporting wheels 51, FIGS. 3 and 16, by means of chains and sprockets as will be described. The wheels 51 are located at one end of the mobile base 30, and are also the driving wheels of the vehicle. Drive is imparted thereto by means of a hydraulic motor HM, FIG. 16. The base 30, in addition to the steerable wheels 51, is equipped with caster wheels 55, FIGS. 3 and 10, and these caster wheels are arranged for pivotal movement at the end of the base 30 opposite the steerable wheels 51. Intermediate these wheels, the base is equipped with a pair of wheels 56 which enable the vehicle to be turned on its own center.

It will be appreciated that the wheels as thus described are carried by the main frame or chassis of the base which is advantageously fabricated from plates and angle bars arranged to accommodate the parts supported thereby in a closely packed relationship. Thus, the caster wheels 55, FIG. 10, are supported at the underside of a main support plate 60, FIG. 3, and the intermediate wheels 56 are journalled on axles which are supported by outer side plates 61 and inner bracket plates 62, FIG. 11, which in turn are rigidly associated with the main support plate 60.

The steerable wheels 51 are relatively large and are secured to a drive sleeve 63, FIG. 16, which in turn is supported by an axle 65. The opposite ends of the axle 65 are mounted in the depending arms 66 of a yoke. The yoke in addition to the arms 66 includes a horizontal top plate 68, and this top plate has the lower end of a steering column 70 welded thereto, the steering column being vertically disposed as will be observed in FIG. 16. Referring to FIG. 10, it should be pointed out that the mechanism thus far described and other parts including the power drive for rotating the wheel drive sleeve 63 are disposed within an upstanding housing 72, FIG. 10, which is located at one end of the base 30 of the vehicle remote from the caster wheels 55. Advantageously, a flashing light EW is mounted on top of the housing 72, and this light, as will be described, flashes when the vehicle is in motion thereby serving as a warning. The steering column 70 is steered by means of a large ring sprocket 73, FIGS. 16 and 17, and the sprocket 73 is adapted to be rotated by a chain 75 which in turn is driven by a spur sprocket 76.

In a vehicle of the kind described, it is important that the drive wheels in particular be capable of good frictional drive contact with the surface over which the vehicle is being moved. In accordance with the present invention, the steerable wheels 51, which are also the drive wheels of the vehicle, are spring-urged downward so that in the event the driving wheels encounter an uneven surface, the spring means will be effective nevertheless to assure firm contact of the driving wheels 51 with the uneven surface. In the present instance, the yoke 66—68 which carries the wheels 51 is arranged for vertical up and down movement as may be required by an uneven surface over which the vehicle is moving. In accomplishing this, spring pressure is applied to the top plate 68 of the yoke, and the arrangement is such that there is no interference with steering motion imparted to the top plate 68 by the steering column.

Thus, as shown in FIGS. 16 and 19, the yoke 66—68 is disposed within a circular housing 75' which is rigidly secured to the main lower frame of the base 30. This housing includes a cylinder 76' which is welded about its lower edge to an associated base plate 77. The plate 77 is bolted to a horizontal support plate 78 which is a part of the main base frame. The housing 75' further includes a top plate 80 welded to the upper edge of the sleeve or cylinder 76', and it will be noted that the top plate 80 is formed with a large central aperture through which the steering column freely projects.

The top plate 80 is also formed with equidistantly spaced and symmetrically arranged apertures 82, FIGS. 16 and 20, and these apertures enable spring biased members to exert a yieldable force on the top plate 68 of the yoke which supports the wheels as will now be described. Thus, each of the apertures 82 has a roller 85, FIG. 16, disposed therebeneath, and the size of the related aperture 82 and roller 85 is such as to enable the roller 85 to move up into the aperture 82 in the event a hump of such unusual size is encountered by the wheels 51. Each of the rollers 85 is journalled for free rotation at the lower end of a vertically disposed support arm 87 which projects upward through and beyond a related aperture 82. The arm 87 has a cross head pin 88 fixed to the upper end thereof, and a pair of coil springs 88S are tensioned between the two ends of the cross pin 88 and anchor lugs 89 which in turn are fixed to the top plate 80 of the housing in which the steering yoke is disposed.

Each support arm 87 is maintained upright and is guided by a guide that includes horizontally disposed cross arms 90 that are supported by upright braces 91 which in turn have their lower ends welded to the aforesaid support plate 80 at points adjacent the related aperture 82. It will be appreciated that the guide arms 90 embrace the roller support arm 87 to assure vertical alignment and free movement of the latter. In order to prevent each roller support arm 87 from being turned or rotated due to the torque established on the rollers 85 during turning of the steering yoke, one of the uprights 91 is slotted at 92 and the free end of a pin 93 is disposed therein. The opposite end of the pin 93 is fixed to the roller support arm 87, and in this manner each roller support arm 87 is secured against rotation.

As was mentioned, a plurality of equidistantly and symmetrically arranged rollers 85 are used, and advantageously these are three in number as will be appreciated from FIG. 20. Accordingly, even pressure will be exerted by the coil springs 88S against the top plate 68 of the steering yoke, thereby subjecting the steering yoke to a spring bias and maintaining the steering yoke in "floating" condition allowing the wheels 51 to conform to uneven surfaces. It will be realized that the rollers 85 constitute a yieldable bearing support for the top plate 68 of the steering yoke. Additionally, the yoke top plate 68 is provided with a thrust bearing race 68B, FIG. 16, which will provide an anti-friction surface between the plates 68 and 80 in the event these should engage.

It was mentioned that the steering column 70 is turned by means of a chain and sprocket arrangement. In this connection, it will be noted that the steering column 70 is disposed within a cylindrical housing sleeve 100, FIGS. 16 and 19, which has the lower end thereof welded to the housing plate 80. Thus, it will be seen that the sleeve 100 is fixed and that the steering column 70 will turn therein. The sprocket 73 surrounds the steering column and is supported for rotation by a collar 101 having its inner edge portion fitted in a guiding and supporting relation in a corresponding groove of a boss 105 which has the gear teeth of the sprocket 73 formed thereon. The guide 101 which thus supports the sprocket 73 is secured non-rotatably to the stationary sleeve 100. This, of course, can be accomplished in different ways, but advantageously lugs 106 are fixed to the underside of the support collar 101 and are arranged to be bolted to the sleeve 100 as shown in FIG. 16.

Rotation imparted to the sprocket 73 is transmitted to the steering column 70 by virtue of a key 73K, FIG. 17, which fits in a drive slot 70S formed in the steering column 70 near the upper end thereof, and this slot of course enables the steering column to move up and down relative to the drive key 73K while enabling the steering column 70 to be turned by means of the key 73K when the sprocket 73 is turned.

It will be observed in FIG. 16 that the steering column 70 extends above the sprocket 73. This extended end of the steering column is used to support many elements of the means which impart vehicle driving motion to a chain 110. This chain is extended down through the steering column 70 parallel to the axis thereof to drive a sprocket 111 which is carried by the drive shaft 63 for the wheels 51. Most of the various motors in the present instance are hydraulically powered. This is true of a hydraulic drive motor HM, FIG. 16, secured to the top of a mounting plate 112 which has a mounting boss 112B welded to the under side thereof. The mounting boss 112B is telescoped over the free upper end of the steering column 70 which projects above the sprocket 73, and the boss 112B is secured to the steering column 70 by set screws or the like. Drive fluid under pressure is furnished to the hydraulic motor HM by motor-powered slow and fast speed pumps P1 and P2, FIG. 21, as will be described hereinafter in more detail. These electric motor and pump sets, as shown in FIG. 11, are arranged in super-imposed relation, with the high speed drive EM2—P2 disposed over the related slow speed motor and pump set, and the oil reservoir or tank containing the hydraulic fluid to be pumped through the motor HM is afforded by a tank 115, FIG. 10 supported by brackets or the like on the support plate 60 of the base. Thus, the oil reservoir 115 is located quite near the associated pumps, and the usual hydraulic lines are extended from these pumps and to the motor HM as shown at 116 and 117 in FIG. 18 for directing fluid under pressure to the impeller of the hydraulic motor HM. The drain line 118 is also shown in FIG. 18 and this of course leads back to the associated tank 115.

The output shaft 120, FIG. 18, of the hydraulic motor HM is connected to the input shaft 121 of a gear reducer 122, and this connection includes a flexible coupling 123. The output shaft 124 of the gear reducer carries a drive sprocket 125, and this sprocket drives the chain 110. As will be explained hereinbelow, the motor HM can be driven at two speeds, slow and fast in forward or reverse directions, and it is for this reason that two pumps are arranged to furnish fluid under pressure to the hydraulic vehicle drive motor HM. If the vehicle is to be driven at the slow speed, only one of these pumps is effective, but for a fast speed both pumps are active thereby racing the hydraulic motor. However, the fast speed can be resorted to only under certain conditions as will be explained.

In addition to being driven by the chain 110, the wheels 51 are to be steered as mentioned, and it will be recalled that steering motion is imparted to the steering column by means of a chain 75. The chain 75 is driven by the sprocket 76 as was mentioned, and referring to FIG. 16 it will be noted that the sprocket 76 is carried at one end of a vertically disposed shaft 130. The shaft 130 is supported in part by an arm 130A which in turn is conveniently secured to the stationary sleeve 100 thereby stabilizing the shaft 130. The opposite end of the shaft 130 is supported for rotation in a thrust bearing mount 132 which in turn is affixed in a stationary position to the mounting plate 77. A transmitting sprocket 135 is pinned to the shaft 130 at a point just above the bearing mount 132, and this transmitting sprocket is driven by a chain 140, FIG. 19 which is extended to the sprocket 135 along a free horizontal path as is shown in FIG. 11. In fact, it may be pointed out that the chain 140 is extended through a slot near the bottom of a housing 72, FIG. 10, and runs beneath the battery set EB to be clear of parts supported by the main support plate associated with the base 30 of the unit.

The end of the chain 140 opposite the sprocket 135 is played about another transmitting sprocket 142 which is fixed on a stub shaft having a larger sprocket 143 also affixed thereto as indicated in FIG. 11. A third chain 145, FIG. 11, is extended about the sprocket 143, and chain 145 at its opposite end is connected to a sprocket 147, FIG. 5, which is provided at the lower end of an upright steering shaft 150. Thus, it will be seen that by turning shaft 150 its sprocket 147 will be turned thereby imparting motion to chain 145. This motion in turn is transmitted through sprockets 142 and 143 to chain 140 and finally to the terminal steering chain 75 to cause steering motion to be imparted to the steerable wheels 51.

The steering shaft 150 is rotated by the steering wheel 50. Thus, as will be evident in FIG. 5, any convenient gearing can be afforded to translate vertical turning movement of the steering wheel 50 into a horizontal turning movement of the shaft 150. Advantageously, this can be accomplished by affixing a bevel gear 151 to the upper end of the shaft 150 to be in meshed relationship with a bevel gear 152 that is to turn with the steering wheel 50, gears such as these being used in a gear box 155, FIG. 10, which is supported at one side of the mast 35.

It will be noted in FIG. 10 that the wheels 56 are located approximately at the center of the base of the unit, and a thirty gallon tank 156 for fresh water is located on the main support plate 60 of the base directly over the wheels 56. On the other hand, the battery assembly, which is quite heavy, is located to the right of the wheels 56 as viewed in FIG. 10, and this is also true of the parts described above that are located within the housing 72 which is disposed over the steerable wheels 51. Other rather heavy parts are located to the left of the fresh water tank including the mast 35 and associated parts, a thirty gallon receiver tank for dirty water and other parts as will be described. Thus, the weight of the vehicle is pretty evenly distributed with respect to the wheels, and this results in maximum stability which is of particular importance when the platform is elevated. Moreover, such relationship of parts enables the vehicle to be turned about the wheels 56 as a pivot point, and hence it will be seen that the vehicle in the present instance has a relatively sharp turning radius.

As has been explained, the platform 32 is supported by the lift head 36 so that the platform 32 can be raised and lowered with the lift head 35. In turn, lifting movement is imparted to the lift head 36 by hydraulically powered lift means which includes a plurality of nested extensible elements as will now be described.

The mast 35, FIGS. 3 to 8 inclusive, is utilized as the main support and guide means for the lift elements as well as for the lift head and the platform, and referring to FIGS. 4 and 5 it will be noted that the mast includes a pair of widely spaced upright plates 160 and 161 which have the lower ends thereof rigidly secured to an extension 60B, FIG. 5, of the main support of the base of the unit. It should be mentioned that in order that over-all movements and association of parts can be readily understood in FIG. 3, FIG. 3 does not now show many of the parts that are illustrated in FIGS. 4, 7 and 8. Thus, referring to FIG. 4, the side plates 160 and 161 are provided with spaced bracket plates 162 arranged at right angles thereto and which project outward of the outer sides of the plates 160 and 161 near the top thereof. Guide rollers 163 rotate on axles therefor supported by the brackets 162, and surfaces of these rollers project through slots in the plates 160 and 161 for a purpose to be mentioned. Other bracket plates 164 are disposed inward of the mast side plates 160 and 161, and these inwardly disposed bracket plates cooperate with the side plates 160 and 161 as the support for axles of other guide rollers 165 having their axes of rotation arranged at right angles to the axes of rotation of the rollers 163.

The rollers 163 and 165 serve to guide and stabilize a lift frame or column 170, FIG. 3, which includes a pair of side plates 171 and 172, FIG. 4, these side plates being disposed inward of the bracket plates 164 mentioned above. Rectangular guide tubes 175 are secured to the outer sides of the plates 171 and 172, and these guide tubes afford vertical channels in which are located guide rollers 176 on axles parallel to the axles which support the guide rollers 163. It will be noted that the guide rollers 163 and 176 are in alignment. Each of the side plates 171 and 172 is provided with bracket plates 177 so supported as to be spaced inward of the inner sides of the plates 171 and 172. These bracket plates 177 in cooperation with the plates 171 and 172 serve as supports for the axles of guide rollers 180 which are free to turn on axes parallel to the axles which support the guide rollers 165. Again it will be noted that guide rollers 165 and 180 are in alignment, such that all of the rollers so far described are nested within the spaces established between the related side plates of the mast and the lift column 170.

It will be observed in FIG. 4 that the guide tubes 175 are nested in the space between the guide rollers 163 and 165. The guide rollers thus supoprted by the mast serve to stabilize the lift column 170, and additionally these rollers afford anti-friction bearings for the lift column 170 so that the latter is free to move up and down freely and in a stabilized and vertically oriented fashion. As will be described below, lift column 170 is adapted to be lifted by a fluid operated ram or piston.

The lift means include a second lift column 185, FIG. 3, and this lift column comprises a pair of inner plates 186 and 187, FIG. 4. The pates 186 and 187 are disposed in parallel vertical planes, and the ends thereof that are disposed toward the steering wheel 50 are provided with vertically disposed solid guide bars 188 which fit in the channels established by the spacing between the guide rollers 176 and 180 that are supported by the lift column 170. It should be mentioned that the side plates 186 and 187 are joined as a unit by means including a bottom plate 190, FIG. 8, and the side plates 171 and 172 of the lift column 170 are united in a like manner.

The lift column 185 additionally includes a pair of vertically oriented, spaced and parallel side plates 193 and 194 that are disposed slightly outwardly of the associated side plates 186 and 187. Such spacing is maintained by spacer bars 195 which are welded to opposed portions of the side plates of the lift column 185 where these overlap at their adjacent fore and aft ends as viewed in FIG. 4. Similarly dimensioned support bars 197 are located at the inner sides of the side plates 193 and 194 at the ends opposite the spacer bars 195, and it will be noted that the arrangement affords vertical channels 200 and 201 in which parts of the lift head are located so as to be guided thereby as will now be described.

The lift head is fabricated from sturdy plate forms to include side plates 203 and 204 and a back plate 205 rigidly secured thereto and which faces toward the mast as shown in FIG. 4. The lift head also comprises a top plate 206, FIG. 14, and this top plate serves primarily as a support for the platform and other parts associated therewith as will be described hereinafter. A lift plate 207, FIG. 4, is rigidly secured to the lift head and is located at the top thereof as shown in FIG. 14. This lift plate is disposed in a horizontal plane and extends toward the lift columns as shown in FIG. 4. Elongated flange plates 209 and 210 are rigidly secured in depending relation at the side edges of the lift plate 207. A pair of guide bars 212 are located in vertically disposed relation at the margins of the flange plates 209 and 210 which are nearest the mast, and these bars 212 are disposed within the guide channels 200 and 201 whereby the lift head will be guided by parts associated with the lift column 185. It will be noted that the guide bars 212 are stabilized between the vertical edges of the plates 186 and 187 which face toward the lift head and the adjacent spaced edges of cooperating guide plates 215 that are rigidly associated with the spacer bars 197 of the lift column 185. It will be seen from the foregoing that lift column 170 is movable independently of the mast, lift column 185 is movable independently of the lift column 170, and finally the lift head 36 is movable independently.

Now referring to FIG. 8, it will be noted that the bottom plate 190 of the lift column 185 carries a hydraulic cylinder 220 having a piston-operated ram 221 arranged therein. The hydraulic supply and drain lines for these cylinders are in part advantageously housed within selected of the vertical channels or guide slots that are embodied in the lift column construction. Thus, the extensible or free running portions of these hydraulic lines are disposed within these channels or guide slots to be free of moving parts while capable of folding and unfolding as it were during actuation of the lift means so as not to become tangled or fouled. In like manner, an electric cable CB, FIG. 7, is arranged within one of the channels afforded by the lift column 185, and this cable carries the wires that extend to the collector ring and other electrical parts that are associated with the platform 32.

The ram 221 associated with the cylinder 220 carries a mounting bracket 225, FIG. 8, at the upper end thereof, and this bracket in turn supports an axle on which three chain rollers 226 are supported for rotation. Three chains 227, FIG. 7, are played over the rollers 226, and ends of these chains are fixed to the lift plate 207 of the lift head as shown in FIGS. 7 and 8. The other ends of the chains 227 extend downward along the side of the cylinder 220 which faces toward the mast and are anchored to the bottom plate 190 associated with the cylinder 220. Hence it will be seen that by furnishing fluid under pressure to cylinder 220 the piston operated ram 221 thereof will be raised. At the same time, the chain rollers 226 are raised and this causes raising of the lift head 36 thereby elevating the platform as will be apparent from the description to follow which is concerned with the way in which the platform is carried by the lift head. The platform can thus be raised to the maximum stroke of the ram or piston rod 221, but the platform can be further elevated by lifting the base plate 190 associated with the cylinder 220 while maintaining the fluid pressure within the cylinder 220 which was effective to advance the piston or ram 221 through its maximum stroke as will be described.

It will be recognized from FIGS. 4 and 7 that the cylinder 220 is located within the space between the side plates 186 and 187. A second hydraulic cylinder 230 is located between the side plates 160 and 161 of the mast and thus is confined inside the mast in contrast to cylinder 220 which in effect is outside the mast. Moreover, and in contrast to cylinder 220, cylinder 230 is anchored to one of the main support plates of the base unit 30. A piston operated ram 231 is associated with cylinder 230, and like the ram 221, the ram 231 carries a bracket 235 at the upper end thereof which in turn supports a horizontal axle on which four chain rollers 236 are free to rotate. Four chains 237, FIGS. 7 and 8, are played over the upper arcs of the rollers 236, and ends of these chains are anchored to the base plate 190 associated with the cylinder 220. Thus, in effect the chains 237 are connected to the lift column 185 near the bottom thereof. The opposite ends of the chains 237 extend downward along the side of cylinder 230 which faces the steering wheel 50, and these ends of the chains 237 are anchored to a fixed plate 240 which in turn is rigidly associated with the mast 35.

The bracket 235 which carries the chain rollers 236 has end extensions (not shown) fixed to parts of the lift column 170, and hence when fluid under pressure in cylinder 230 is effective to raise the ram 231 thereof, the lift column 170 will at the same time be raised, and since the chains 237 are anchored to the base plate which carries the cylinder 220 the lift column 185 will also be raised. However, in view of the way in which the rollers 236 are arranged intermediate the ends of the chains 237, the lift column 185 will move two space increments for each space increment through which the lift column 170 is raised. Likewise, when the lift head is raised solely by the action of ram 221, it will advance through two space increments for each increment of movement of the bracket 225.

Figure 21:
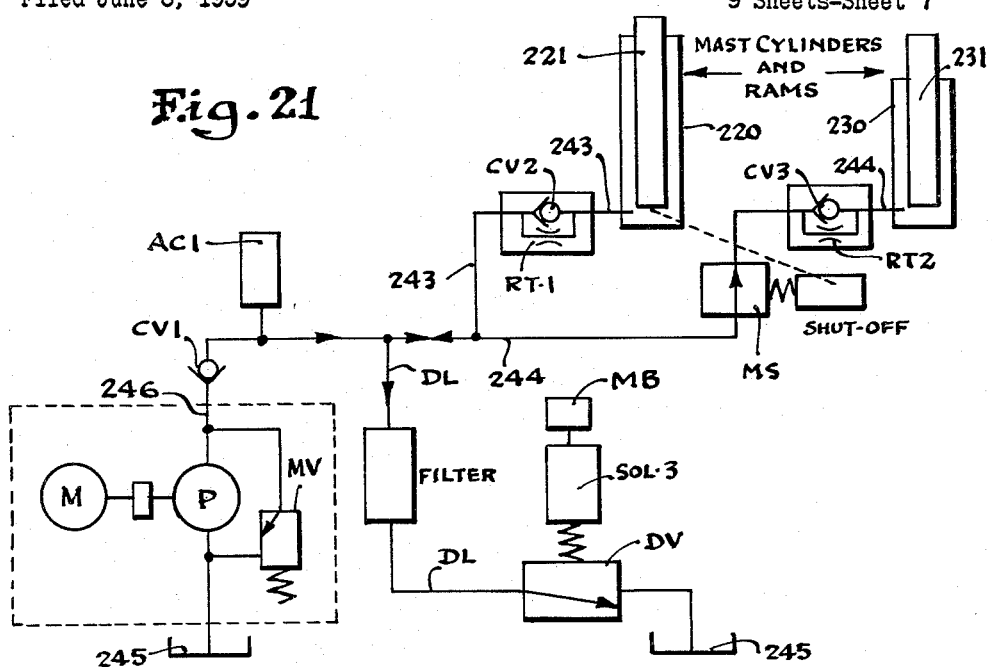
FIGS. 21 and 22 are diagrammatic views of the hydraulic circuitry used in the present construction.

Fluid under pressure is furnished independently to the cylinders 220 and 230. The hydraulic circuitry involved is illustrated in FIG. 21 and will be described hereinafter. It may be noted, however, that hydraulic lines 243 and 244, FIG. 8, are connected respectively to the cylinders 220 and 230. These lines also allow the cylinders to be drained to the tank or reservoir, and in this connection fluid for the cylinders 220 and 230 is contained in a tank 245, FIG. 11, located on the base of the unit just over one of the caster wheel sets on the side of the base opposite the side where the tank 115 is located. Hydraulic fluid is furnished under pressure from the tank or reservoir 245 to the cylinders 220 and 230 by a pump P, FIGS. 11 and 21, driven by an electric motor M. It should be mentioned further in this connection that since the ram 221 only carries the weight of the platform, whereas ram 231 when effective will bear this weight as well as the weight of the lift column 170 and 185, fluid under pressure furnished by the pump P throgh its outlet line 246, FIG. 21, will be effective to follow the line of least resistance along supply line 243 into cylinder 220. When the ram 221 has been raised through its maximum stroke, and if motor M is still held energized, fluid under pressure will then follow lead 244 into cylinder 230 assuming of course that the platform is to be elevated still further. It will be appreciated that stops will be associated with the cylinders 220 and 230 effective to determine the maximum strokes of the rams associated therewith, and these stops can be made adjustable if desired.

The platform 32 is arranged with respect to the lift head 36 so as to be supported thereby for rotation. The particular supporting arrangement is one that establishes a cantilevered relationship between the platform and the lift head, thereby establishing a wide sweep for the platform. It will first of all be observed that the lift head in over-all appearance is of inverted L-shape. Reference was made above to the plate construction of the lift head, and these plates are rather widely spaced as will be observed in FIGS. 12 and 14, and this establishes a housing in which are located the elements for producing turning movement of the platform. The over-all construction of the platform will be described in more detail below, and hence in connection with platform turning it is sufficient to point out for the moment that the platform includes a floor plate 250 on which the operator can stand. This floor as will be described below, has a relatively large clearance area which is disclosed when the platform is down over the mast to enable the mast to extend therethrough. When the platform is raised above the mast, this clearance area is closed by a trap door enabling the workman to traverse the full extent of the platform floor incidental to performing service operations.

An electric motor EM3, FIGS. 14 and 15, is located within the housing afforded by the L-section side plates of the lift head, and this motor is carried by a mounting plate 252 which is supported under spring tension as will be described. This motor is a reversible D.C. motor as will be described in detail hereinafter and the drive shaft 253 thereof drives a pulley which in turn drives a belt 254 which drives a pulley 255 carried by the input shaft 256 of a gear reducer 257 located within the lift head housing. Thus, the gear reducer is supported by a mounting plate 258 which in turn is bracket-mounted on one of the L-shaped side plates of the lift head. Advantageously, a steel band 255B is freely looped over the end of shaft 255. The band will rattle as a warning signal when the platform is being turned.

A coupler 260 connects the driven shaft of the gear reducer to a platform turning shaft 261 which is vertically disposed within the lift head housing as will be noted in FIGS. 14 and 15. The shaft 261 is extended to drive a spur-type sprocket 262, FIG. 12, which is located in the space between the floor of the platform and the top of the lift head housing as will be evident from FIG. 15. The sprocket 262 has a chain 263 associated therewith which is played around a platform turning sprocket 264. Advantageously, an adjustable slack adjusting sprocket 266 is supported in position above the top of the lift head housing to apply a predetermined amount of tension to the chain 263 to assure effective action of the latter. Thus, the sprocket 266 is carried by a bracket 270, FIG. 12, which is slotted at 271. The bracket 270 is secured in position by nut and bolt assemblies, and spacers as may be required, in association with the slot 271 in the bracket 270. By loosening the nuts, the bracket 270 can be positioned to apply the proper amount of tension to the chain 263, whereupon the nuts are then tightened to maintain this condition.

The turn sprocket 264 is fixed to the floor of the platform so as to turn the platform as an incident to operation of the chain 263 in either direction. The platform is supported for turning about a vertical axis determined by a bearing assembly carried by the lift head. Thus, and referring to FIGS. 14 and 15, the turn sprocket 264 is secured to the under-side of the floor 250 of the platform by bolts 264B. The shanks of the bolts extend through apertures in the platform floor 250, and spacers 264S are fitted thereabout, and the heads of the bolts support the under-side of the turning sprocket 264. In this manner, the turn sprocket 264 is affixed to the floor of the platform and is spaced therefrom to assure free action of the turn chain 263. It may incidentally be pointed out that the sprocket 264 is adapted to turn relative to a sump or collector annulus 275 which serves as a collector for dirty or used water drained from the sink on the platform. The construction of this used water receiver will be described below in connection with other water supply and drain parts that are advantageously associated with the lift head and the platform bearing mount which will be described below immediately following an explanation of the way in which "slip" is accounted for in the event the platform, while being turned, should encounter an immovable obstacle.

Referring to FIGS. 14 and 15, it will be observed that the plate 252 which carries motor EM3 is pivotally supported on a mounting bar 252B which in turn is supported by a pair of brackets 252R secured to the lift head back plate 205. A spring 252S, FIG. 14, is fixed at one end on plate 252 and at its other end is acnchored to a fixed part of the lift head. The spring 252S is normally effective to position plate 252 to maintain the proper amount of tension on belt 254 to assure effective platform turning when motor EM3 is energized. If, however, the platform encounters an obstacle then the excessive strain on belt 254 causes plate 252 to in effect shift whereby motor EM3 effectively "idles."

The platform bearing mount includes an upright cylindrical post 280, FIG. 15, which has the lower end portion thereof projected through an opening in the floor 250 of the platform over-lying the lift head housing 36H, FIG. 15. The lower end of the bearing post 280 is rabbeted, and the reduced diameter portion is disposed in a mounting opening in the top plate 206 of the lift head housing 36H. The bearing post 280 is secured to the top plate of the lift head housing by a weldment as indicated in FIG. 15.

A sleeve 281 surrounds the bearing post 280, and the lower end of this sleeve is welded to the platform floor. The sleeve 281 serves as part of a stabilizer arrangement for the platform. Thus, as will be described, the bearing post 280 affords a thrust bearing which facilitates turning movement of the platform, but in order to relieve this thrust bearing of excessive strains, especially when the platform is extended outward of the side where the lift head is located, stabilizer rollers 281R, FIGS. 15 and 15B, are arranged to engage the outer periphery of the bearing post 280. The rollers 281R are associated with vertical axles 281A which have their ends respectively supported by the platform floor and by lugs 281L which are secured to the outer side of the sleeve 281. As shown in FIG. 15A, openings are provided in the sleeve 281, and segmental portions of the rollers fit therein to be engageable with the outer surface of the bearing post 280. Hence, any canting tendency of the platform that is, canting out of horizontal caused by an excessive moment, will be prevented by the rollers 281R engaging the bearing post 280, and this relieves strain on the thrust bearing which will now be described.

The bearing post 280 supports the weight of the platform. To this end, the outer surface of the bearing post 280 near the upper end thereof is chamfered as best shown in FIG. 15B, and in like manner the inside surface of the sleeve 281 is chamfered so that when the post and its sleeve are associated as shown in FIG. 15B, a resultant groove is provided in which a thrust bearing assembly 290 is disposed. The thrust bearing assembly is held in place and engaged by an annular part 291 which is affixed to the sleeve 281, and thus it will be seen that the thrust bearing 290 supports the weight of the platform. It may be pointed out in this same connection that a cam LSC2, FIG. 15A, is carried by the sleeve 281 so as to partake of any turning motion of the platform, and this cam controls a limit switch LS5 to be described hereinbelow.

One of the important features of the present invention is that fresh or clean water can be supplied to a sink on the platform, and used or dirty water can be drained therefrom at any rotative or elevated position on the platform. This is made possible in part by extending the fresh water supply line up through the lift head coincidental with the turning axis of the platform. Additionally, the extensible drain line 46, which comprises a plurality of telescoped copper tubes of decreasing diameter, is also extended up through the lift head, but the drain line is eccentric of the turning axis of the platform and communicates with a sump or gutter which is carried by the lift head so as to be independent of rotary movement of the platform.

Thus, referring to FIGS. 14 and 15, it will be noted that the fresh water hose 45 has its upper end portion extended to a bracket 291 which depends from the horizontal arm of the lift head, and a collar 292 is secured to the hose and is supported by the horizontal leg of the bracket 291 so that the hose will be extended during raising of the platform. This hose, as shown in FIGS. 10 and 11, is wound on the spring biased reel 295 which is supported on the base unit beneath the lift head in the collapsed state of the platform. The reel 295 is spring biased in a known manner so as to automatically wind up the hose 46 at times when the platform is being lowered from an elevated position. On the other hand, when the platform is raised, the hose is unwound against the return action of the spring bias embodied in the winding reel 295.

The end of the hose on the reel communicates with a pipe 45P, FIG. 11, carried by the reel, and this pipe in turn is supplied with fresh water by a hose 45A, FIG. 11. The other end of the hose 45A communicates with the fresh water pump having the motor EM4, FIG. 11. Fresh water in turn is supplied to this pump by a hose 45B, FIG. 11, which connects to the fresh water supply tank 156, FIG. 10.

The water supply line includes a copper tube 293 in communication with the hose 45 through the coupling 292. The tube 293 extends up through a collector ring assembly ER, FIG. 14, and this collector ring will be described in detail below in connection with the wiring diagram. In this connection, however, it should be explained that in order that the collector ring ER will turn with the platform, the collector ring is affixed to the lower end of a tube 300 which, as shown in FIG. 15, extends up through the bearing post 280. A collar 301 is secured to a portion of the tube 300 which projects above the bearing post 280. In turn, arms 301A are affixed to the collar 301, and the opposite or lower ends of these arms are secured to the sleeve 281 which, it will be recalled, turns with the platform. Hence, it will be seen that the collector ring assembly ER which contains numerous important collector ring elements embodied in the electrical control circuit will turn with the tube 300 when the platform is turned.

It will be further observed from FIGS. 14 and 15 that the water supply tube 293 is mounted within the tube 300 whereby the tube 300 is utilized in part as a guard for the upper end of the copper tube 293. The tubes 300 and 293 are further extended upward from the bearing post 280 as shown in FIG. 9, so as to be within the central one 41 of the three water basins 40, 41 and 42 shown in FIG. 6. It will be appreciated that tube 300 is stationary within the sink 41, but the free end of the tube 293 which communicates with the hose 45, is connected to a swivel coupling 45J, FIG. 9, which has a spout or faucet 305 connected thereto. The spout 305 is of such length as to enable the downwardly bent outlet end thereof to be turned to discharge fresh water into any of the three basins or sinks 40, 41 and 42. Fresh water can be provided at any time merely by energizing the motor which drives the fresh water pump.

Each sink 40, 41 and 42 is equipped with the usual drain opening and drain plugs as DP, FIG. 9. A stub drain pipe 306, FIG. 9, is connected to each drain opening and these in turn are connected to a header 307, and the header 307 communicates with a discharge pipe 308 which is arranged, as shown in FIG. 13, to discharge used water into the annular sump 275. The sump 275, as was mentioned above, is affixed to the top plate of the lift head so as to be independent of the rotary motion of the platform. As shown in FIG. 13, the sump 275 includes a bottom plate 310 which has a pair of vertically disposed annular flanges 311 and 312 welded thereto in spaced relation so as to define an annular gutter 275G, and it is this gutter into which the pipe 308 is arranged to discharge its contents. The sump plate 310 is formed with a relatively large aperture 310A at its medial area, and this opening enables the bearing post 280 to project therethrough as will be appreciated from FIG. 15.

It will be realized from the foregoing that the pipe 308 will discharge its contents into the gutter 275G at any rotative position of the platform, and of course the parts are accurately dimensioned and spaced so that the pipe 308 will not encounter any obstacle during turning motion of the platform. The gutter 275G is in effect tapped by a stub pipe 315, FIG. 13, which in turn communicates with the upper one of the plurality of copper tubes which afford the rigid drain line 46. This upper tube is identified in FIG. 13 as tube 46T3, and under the present construction the drain line comprises two other tubes 46T2 and 46T1, FIG. 3, of increasing diameter. Fluid tight seals are of course provided between the telescoped tubes which afford the main drain line 46, and these seals or fittings are of a kind which allow free running or extensibility of the telescoped tubes.

As shown in FIGS. 3 and 11, the lower or larger one of the telescoped drain tubes 46T1 terminates in communication with a tank 320 which receives the used or dirty water that may have been drained from the sinks on the platform. One part of this tank is located directly under the hose reel, but the major part thereof 320A is under the mounting plate 60 and extends between the casters 55 and the center turning wheels 56. Referring to FIG. 11, an exhaust line for used water is disposed at one side of the base of the unit, and a pump driven by a motor EM3', FIG. 11, is associated therewith enabling the dirty water tank to be exhausted at any time. Thus, the pump driven by the motor EM3' is arranged to pump dirty water from the receiver tank 320, and this water is pumped out an exhaust line 321, FIG. 11. This exhaust line is provided with a bib 321B enabling a garden hose to be coupled thereto so that dirty water can be discharged into a remote area.

It will be observed in FIGS. 1 and 6 that the sinks 40, 41 and 42 are located at one end of the platform and the various control switches are located at the other end. The control switches, as will be appreciated from FIG. 1, are accessible to the operator when steering vehicle, but are not readily accessible when the operator is working near the sinks, and hence, when the operator is working near the sinks there is little likelihood that a vehicle control switch will be inadvertently actuated. However, it should be pointed out with reference to FIG. 6 that the fresh water control switch E130 is located adjacent a sink on the platform. The switch E122 for energizing motor EM3' which drives the used water pump is located in an accessible position on the base of the unit, FIG. 11.

It was mentioned above that the floor of the platform is provided with a clearance area enabling the mast to project therethrough as will be evident in FIG. 1. This clearance area has a trap door 250T, FIG. 10, associated therewith. This trap door is hinged at one side, as indicated at 250H in FIG. 6, and can therefore be raised by the mast as shown in FIGS. 1 and 10 when the platform has been lowered down over the mast to a point where the top of the mast projects above the floor 250 of the platform.

A pair of catch panels CP1 and CP2, FIG. 1, are advantageously located at the opposite sides of the platform. These catch panels embody a tubular frame of rectangular dimensions and a canvas sheet CH is supported thereby in each instance. The frames of the catch panels are conveniently hinged at their lower ends as viewed in FIG. 1 to adjacent parts of the platform, and light-weight chains are provided to support the catch panels in outwardly extended position when desired as illustrated in FIG. 2 so as to serve as catches for sponges and the like that may be inadvertently dropped by the worker.

CONTROLS—FIG. 23

Vehicle forward—slow or fast

Depending upon the number of batteries EB, FIG. 23, these are connected in series and a wire E1 is extended from the battery EB to one collector ring of a collector ring assembly ER. A wire E2 is connected to this same collector ring and extends to a grounded auxiliary socket ES which can be used as a multi-purpose outlet for extension cords, power tools and the like, the socket ES being located conveniently on the vehicle. Another wire E3 is attached to this same collector ring and leads to one of the contacts E5 associated with the ignition switch of the vehicle. The other contact E6 of this switch is connected to a wire E8, and when the ignition switch actuator is closed on the contacts E5 and E6 upon turning the ignition key, it will be seen that circuit is extended from the positive terminal of the battery to wire E8.

Assuming the vehicle is to be moved forward, the "forward" manual switch button E10 is moved from its contacts E12 to its contacts E13. All manual switch buttons are of the kind that must be held pressed in to continue the circuit, and which otherwise return to their manual position when released. One of the contacts E13 is connected to wire E8 through wire E16, E17 and E18. The other contact E13 is connected by a wire E20 to a collector ring, and this same collector ring has a wire E21 extended therefrom to the grounded coil of start relay E22 associated with motor EM1 which drives its fluid pump P1 which in turn pumps operating fluid to the hydraulic drive motor HM. Motor EM1 is thus energized to induce a slow forward speed to the vehicle, and a warning light EW is connected to ground and to wire E21 to thereby flash when circuit is completed to relay E22.

Figure 22:
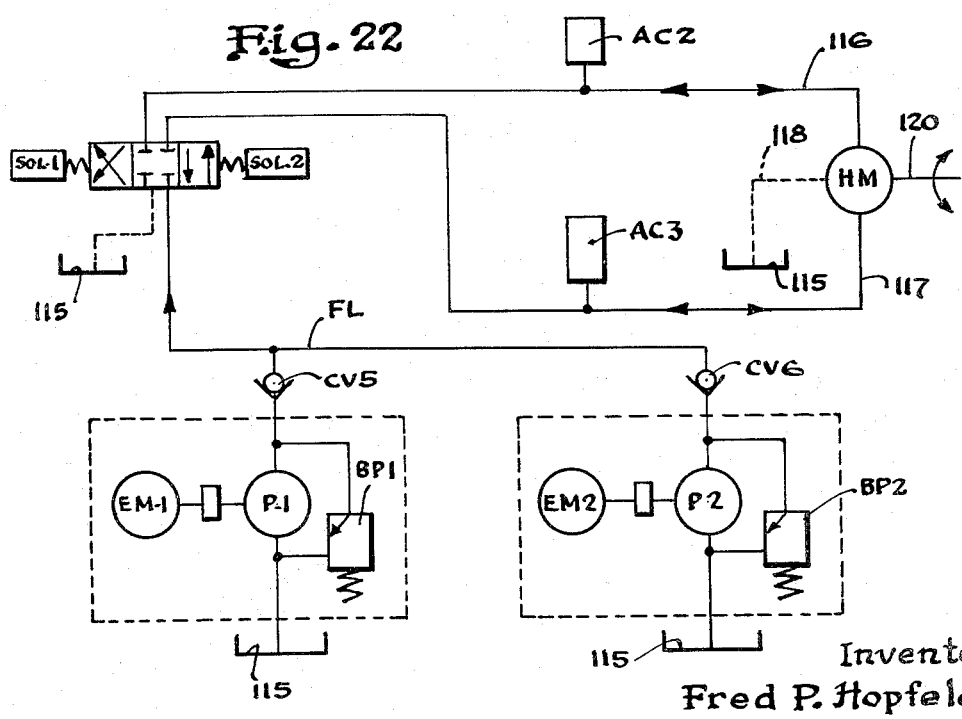

The manner in which the four-way valve for pump P1, FIG. 22, is positioned to produce a forward movement of the vehicle by way of an appropriate directional drive for the hydraulic drive motor HM, FIG. 22, will be described below. A horn EH on the vehicle can be blown at any time when the ignition switch is closed simply by moving its momentary switch actuator E23 onto its live contacts as will be obvious from FIG. 23.

If a fast forward speed is desired, motor EM2 which drives its fluid pump P2 is to be simultaneously energized with motor EM1 to thereby furnish fluid at a greater operating rate to the hydraulic drive motor HM. This is accomplished by energizing the coil of start relay E24 for motor EM2, noting that the coil of relay E24 is connected to ground in common with the coil of relay E22. The other side of the coil for relay E24 is wired to the live contact of a limit switch LS1 which is to be maintained open so long as the platform is not in a lowered position. Thus, upon closure of switch LS1 when the platform is all the way down, the coil for relay E24 is thereby connected to a wire E27 which leads to a collector ring, and a wire E30 is connected to this same collector ring and leads to one of the live contacts E31 of a "fast" control switch having an actuator E32. When the actuator E32 is moved to bridge its live contacts E31, circuit for the coil of the start relay E24 is further extended to a wire E34 in turn connected to wire E16 which, it will be recalled, is connected to wire E8, and this completes the circuit for start relay E24. If the platform is raised at all, limit switch LS1 will be opened, and hence the vehicle cannot have a fast speed imposed thereon when the platform has been raised. The present controls include many limit switches. The function of the particular limit switch in each instance will be explained, and the limit switch will be located where there is a mechanical counterpart to this function. Thus, limit switch LS–1 can be located at the base of the mast of the vehicle as shown in FIG. 10 in position to be held closed by the bottom of the lift head when the platform has been completely lowered, and to be allowed to open the instant the platform is raised.

If the vehicle is to be slowed from a fast feed, the "fast" switch is released, and if the vehicle is to be stopped from a fast feed the "fast" switch is released first before the "slow" switch. The vehicle is so constructed that this will result in a smooth self-braking stop.

Vehicle reverse—slow or fast

If the vehicle is to be reversed, the "reverse" switch is closed by a corresponding movement of the reverse switch actuator E36 off bridging relation with its contacts E37 and into bridging relation with its contacts E39, bearing in mind that under such circumstances the "forward" switch actuator will be bridging its contacts E12 in a normal or "released" condition. One of the contacts E39 is connected to wire E20 by a wire E40, and it will be recalled that wire E20 together with wire E21 extends circuit to one side of the coil for start relay E22 which is connected to ground. The other of the contacts E39 associated with the "reverse" switch is connected by wire E43 to wire E34, which in turn through wires E16, E17 is connected to wire E8 corresponding to the positive terminal of the battery, and hence circuit is completed to the coil for the start relay E22 when the "reverse" switch is moved onto its contacts E39. This will energize the pump motor EM1 for a slow reverse speed, and if a fast reverse speed is desired, the "fast" control switch is simultaneously actuated and held in and results in the pump motor EM2 again being energized simultaneously with motor EM1 in the manner explained above.

*Emergency stop*

The vehicle when moving can be subjected to an emergency stop by pressing a momentary switch actuator E45 which engages related contacts, one of which is connected to ground as shown in FIG. 23 and the other of which is connected to a wire E47 in turn connected to wire E17 which, through wires E18, E8 and E3 is connected to the collector ring to which wire E1 is connected. An over-load 15 amp. fuse E51 is interposed in wire E1 which in turn is connected to the positive terminal of the battery, such that when the emergency stop switch is actuated fuse E51 is blown breaking circuit in wire E1.

*Hydraulic motor drive—forward or reverse*

The four-way valve, FIG. 22, which controls the direction of flow of fluid under pressure from the pumps P1 and P2 to the hydraulic drive motor HM, is to be positioned properly as an incident to the actuation of the "forward" control switch or the "reverse" control switch as the case may be. Solenoid SOL1, FIGS. 22 and 23, when actuated, positions the four-way valve so that fluid under pressure furnished by pump P1 (or pumps P1 and P2 working simultaneously for a fast speed of this vehicle) will flow in a direction through the hydraulic drive motor HM to produce a forward movement of the vehicle. Conversely, actuation of solenoid SOL2 results in a reverse drive imparted to the fluid motor HM.

Referring to FIG. 23, the two coils of the solenoids SOL1 and SOL2 are commonly connected to ground, but respective windings are such that current flows in directions so that only one coil or the other can be energized at one time. Thus, the coil of solenoid SOL1 is connected by a wire E60 to a collector ring, and this same ring has a wire E62 extending therefrom to one of the contacts E37 bridged by the "reverse" switch actuator E36 in its unactuated state. The other of the contacts E37 has a wire E65 connected thereto, and this wire is in turn is connected to wire E40 which is in circuit with wires E8 and E3 bridged by the closed ignition switch. Hence, when the "forward" switch actuator E10 is moved on to its contacts E13 it will be seen that the coil for solenoid SOL1 will be energized, and this circuit requires that the "reverse" switch be in its normal released or "open" position to bridge its contacts E37. Consequently, the four-way valve will be properly positioned to allow forward movement of the vehicle.

If the vehicle is to be reversed in its movement, solenoid SOL2 is to be energized. To this end, a wire E68 is connected to the positive side of the coil for this solenoid, and leads to one of the collector rings. Another wire E70 in this circuit leads from the same collector ring to one of the contacts E12 of the "forward" switch, and the other of the contacts E12 is connected by a wire E71 to the contact E13 of the "forward" switch which has wire E40 connected thereto. It will be recalled that wire E40 is connected to one of the contacts E39 of the "reverse" switch, and hence when the contacts E39 are bridged upon closure of the actuator E36 of the "reverse" switch, circuit is extended from wire E40 to wire E43 which is in circuit with wires E8 and E3 bridged by the closed ignition switch. Hence, circuit to the reverse solenoid SOL2 is completed, and this circuit requires that the "forward" switch be in its normal or unactuated position bridging its contacts E12.

Thus, solenoid SOL1 (forward) can be energized only if the ignition switch is closed and only if the "forward" switch is actuated to engage its contacts E13 and only if the "reverse" switch is unactuated to thereby be bridging its contacts E37. Likewise, solenoid SOL2 (reverse) can be energized only if the ignition switch is closed and only if the "reverse" switch is moved to its contacts E39 and only if the "forward" switch is unactuated to thereby be bridging its contacts E12. If neither of the foregoing conditions prevails (contacts E13 bridged or contacts E39 bridged), it will be seen that neither solenoid SOL1 nor SOL2 can be energized even though the ignition switch is closed, and hence the four-way valve will remain in its neutral position shown in FIG. 21.

CONTROLS CONTINUED—PLATFORM

*Platform raise*

Two of the more important safety features embodied in the vehicle of the present invention are that the platform cannot be raised or lowered while the vehicle is in motion, nor can the platform be raised if the vehicle is on a surface having a slope of greater than 2°. These safety features are incorporated in the circuit for the motor which is responsible for driving the pump that furnishes fluid under pressure to the two platform raising cylinders, FIG. 21, which govern raising and lowering of the platform. This circuit requires that a mercury levelling switch be not more than 2° out of horizontal and that neither the "forward" nor "reverse" switch in the vehicle drive control circuits be actuated.

Thus, in order to raise the platform in any event, the "raise" switch must be closed by moving its actuator E80 into bridging engagement with its contacts E81. One of the contacts E81 is connected to a wire E83, and the other is connected to a wire E84 which in turn terminates at one of the collector rings. A wire E85 leads from this same collector ring to one side of the coil of a relay E87. A wire E88 is connected to the other side of this coil and is connected to a mercury switch E90 wired in series with a paired mercury switch E91 which is connected to ground. Thus it will be seen that circuit for the coil of relay E87 is connected to ground when the "raise" switch is closed unless mercury switch E90 is more than 2° out of horizontal (say a right hand tilt of the vehicle) or in the alternative unless mercury switch E91 is more than 2° out of horizontal (say a left hand tilt of the vehicle).

Now to complete the description of the closing the circuit for relay E87, it will first of all be recalled that the other contact E81 of the "raise" switch is connected to a wire E83. Wire E83 is connected to a wire E95 which terminates at a contact E97 normally engaged by the normally closed switch arm E99 of a safety relay E100. The switch arm E99 is connected to a wire E101 which in turn is connected to wire E8 which corresponds to the positive terminal of the battery.

Hence, it will be seen that when the mercury switch conditions are satisfied as explained above, and so long as the relay switch arm E99 is on contact E97, circuit can be completed to the coil of relay E87 if the ignition switch is closed. The armature of relay E87 carries a switch arm E105, and when the coil of relay E87 is energized switch arm E105 is moved to bridge the associated contacts E107 thereby extending circuit from wire E85 (positive) to a wire E110. Wire E110 is connected to one side of the coil of a control relay E112 which controls energization of motor M, FIGS. 22 and 23, which drives the pump P.

Pump P is the pump which furnishes fluid under pressure to the cylinders which govern raising and lowering of the platform. Thus, the other side of the coil of relay E112 is grounded, and circuit thereto is completed upon energization of relay E87 which, it will be appreciated, is a holding relay that will be effective to extend circuit to relay E112 so long as the mercury switches are "level." When the coil of relay E112 is energized, a switch arm E115 associated with the armature thereof is moved to bridge contacts E116. One of these contacts is connected by a wire E117 to the ground wire of motor M, and the other of the contacts E116 is connected by a wire E118 to the positive terminal of the battery.

It will also be noted that the contact E116 which has wire E118 connected thereto has another wire E120 connected thereto. This wire leads to a manual switch E122 which when closed extends circuit to motor EM's for the soiled water pump which, therefore, can be operated at will and at any time. It should be pointed out in this same connection that the motor for the clean water pump is identified at EM4 in FIG. 23. Motor EM4 of course has a ground wire, and another wire E126 (to positive) is extended therefrom to a collector ring. This same collector ring has a wire E127 connected thereto, and this wire leads to a control switch E130 which when closed further extends circuit for motor EM4 to a wire E131 which is connected to wire E18 whereby it will be seen that if the ignition switch is closed and if switch E130 is closed, the motor EM4 for driving the clean water pump can be energized.

Now to return to the controls for motor M, it will be realized that if switch arm E99 is off contact E97, circuit to motor M cannot be completed when the "raise" switch is closed. Switch arm E99 will be forced off its contact E97 if the coil of relay E100 is energized, and in this event switch arm E99 will engage a contact E140 which has a wire E141 connected thereto. To warn the operator of this condition, wire E141 can be connected to the positive contact of the horn EH or to the positive contact of a bell EB. By doing this, the horn or bell can be sounded as a warning when the vehicle is in motion (as will be seen from the description immediately following) or when the platform is being lowered as will be explained.

The coil of relay E100 will be energized in the following manner when the vehicle is in motion. Thus, one side of this coil is grounded and the other side of this coil is connected to one end of a wire E145. Wire E145 is connected at its opposite end to one of the contacts E39 of the "reverse" switch actuator having the actuator E36, and this same end of wire E145 is connected through wire E40 to one of the contacts E13 of the "forward" switch having the actuator E10. Accordingly, if the "reverse" or "forward" switch is closed incidental to inducing movement of the vehicle, a circuit will be completed to the coil of relay E100, as can be easily traced in FIG. 23, and in such a circumstance, circuit to relay E87 will be broken at switch arm E99, start relay E112 cannot be energized, motor M cannot start, and the horn or bell will sound. Therefore, the platform cannot be raised when the vehicle is in motion, slow or fast, nor can the platform be lowered or turned when the vehicle is in motion, as will be explained.

Thus, it will be recalled that switch arm E99, on its contact E99 to thereby connect wire E95 to wire E101, is part of the positive lead for the coil of relay E112, and that when switch arm E99 is opened upon energization of relay E100 this positive lead is broken thereby preventing completion of a circuit to relay E112 when the vehicle is moving. This same safety circuit, which requires wires E95 and E101 to be joined by switch arm E99 on contact E97, is utilized to prevent turning of the platform when the vehicle is moving as will now be explained.

The platform can be turned to the left or right only when the vehicle is stationary by engaging the "left" switch or "right" switch upon movement of their respective actuators E150 or E151, FIG. 23. If the switch actuator E150 for a platform left turn is actuated, its switch element bridges contacts E153, thereby extending circuit from a wire E155 to a wire E156. Similarly, if the switch actuator E151 for a platform right turn is actuated, its switch element bridges contacts E158 thereby extending circuit from a wire E160 to a wire E161. The wires E155 and E160 are negative or ground leads to the controls which govern platform turning, and the elements associated therewith will be described below. On the other hand, wires E156 and E161 are positive leads and it will be noted that both are extended to one of the contacts E162 normally bridged by the switch element of an actuator E165 that represents a "center" switch for producing centering movement of the platform as will be explained.

The platform "center" switch has to be actuated simultaneously with the platform "left" or platform "right" switch to engage its contacts E166 to produce a centering of the platform when the latter is in a non-centered position, and it will be noted that a wire E167 joins respective ones of the contacts E162 and E166 of the "center" switch whereby wire E156 is in series with both of these contacts. However, if the platform "center" switch is bridging contacts E162, then if actuator E150 is moved to cause bridging of contacts E153 (left platform turn) or if actuator E151 (right platform turn) is moved to cause bridging of contacts E158, then wire E156 or wire E161 as the case may be will be connected to wire E95. Wire E95 is therefore, part of the positive lead for the "platform left" or "platform right" control (to be described) and since this positive lead includes the switch arm E99 it will be seen that these platform turn controls cannot be effective in the event switch arm E99 is off contact E97 and on contact E140 which, it will be recalled, will be the case if the vehicle is moving. The controls which are energized incidental to a platform turning movement will now be described.

Turning movement of the platform emanates from a D.C. motor EM3, FIG. 23. The armature of the motor EMC has wires E200 and E201 connected thereto. These wires terminate respectively at contacts E204 and E205. Contact E204 is connected to a contact E206 by a wire E207, and contact E205 is connected to a contact E208 by a wire E209. A contact E204' is paired with contact E204, a contact E205' is paired with contact E205; a contact E206' is paired with contact E206; and a contact E208' is paired with a contact E208. Contacts E204' and E205' are connected by a wire E210, and contacts E206' and E208' are connected by a wire E212.

All of the contacts thus described are part of a mechanically interlocked, reversing double pole, double throw magnetic contactor designated in its entirety in FIG. 23 by the arrowed reference character EMC. This control element includes two coils E214 and E215 and associated armatures. Each armature carries two switch arms which control the reversal of current through the coil E216 of the motor EM3 to thereby determine the direction of rotation of this motor and hence that of the platform. If coil E214 is energized, contacts E204—E204' and E208 and E208' are bridged. If coil E215 is energized, contacts E205—E205' and E206—E206' are bridged. It will be noted that contacts E206' and E208' are connected to ground by wires E212 and E218. A wire E220 leads from contact E208' to coil E214 and another wire E221 in this same grounded lead is connected to coil E214 and to coil E215. Coil E215 can, therefore, be energized provided it is connected back to positive, and this can in fact occur if the platform "left" switch button is actuated to cause contacts E153 to be bridged to connect wire E155 to wire E156.

Thus, it will be recalled that the positive lead associated with contacts E153 has been described above as including wire E156 which will be connected to wire E155 when the switch arm of the actuator E150 bridges contacts E153. Wire E155 is connected to one of the collector rings, and a wire E225 leads from this same collector ring through a normally closed relay controlled switch E225A which can be provided if desired for reasons to be explained. A wire E226 leads from switch E225A to the coil E215, and in this manner E215 is adapted to be energized upon closure of the platform "left" switch provided switch E225A is closed.

When coil E215 is energized, wire E201 (to the armature of motor EM3) is then in effect joined to wire E210 since contacts E205—E205' are bridged by a switch arm on the armature of coil E215. Wire E210 is connected to contact E204'. One wire E230 leads from contact E204' to the collector ring which has wire E1 joined thereto (positive) and another wire E231 leads from contact E204' to the coil E216 of motor EM3.

Likewise, when coil E215 is energized, the other switch arm on its armature is effective to bridge contacts E206—E206' to thereby connect the motor armature wire E200 to ground, and circuit to the armature of motor EM3 is complete. Contact E206' has a wire E234 extended therefrom to the coil of motor EM3, and circuit to the motor coil is complete.

To accomplish a right hand turning movement of the platform, the platform "right" switch button is actuated to cause contacts E158 to be bridged by the switch arm associated with the actuator E151. This connects wire E158 (positive as described above) to wire E160 which is connected to a collector ring. A wire E235 leads from this same collector ring through a normally closed relay controlled safety switch E235A which, like switch E225A can be advantageously provided if desired. A wire E236 leads from switch E235A and is connected to coil E214, and assuming the positive lead connections to be complete coil E214 will energize to cause the switch arms of the armature associated therewith to bridge contacts E204—E204' and E208—E208' which completes circuit to the armature of motor EM3. The flow of current through the armature is, however, opposite to that described for a left turn, and hence the rotation of the motor EM3 is the reverse of that for a platform left turn.

If the platform is to be turned left or right from a centered position with respect to the mast, or if the platform is to be turned through 360° when clear of the mast, then only the "platform left" or "platform right" switch button will be pressed, and the "platform center" switch button will not be actuated, whereby its switch element E165 will remain in bridging relation on contacts E162.

However, to turn the platform left or right from a non-centered position back to an automatically centered position directly over the mast in a "zero" position (see FIG. 24) for example to enable the platform to be lowered all the way down to its parked position over the mast, the "center" switch button must be held in simultaneously with the "left" or "right" switch button as the case may be and should be the first one released. Under such circumstances, wire E156 (left) or wires 160 and E161 (right) are still the effective positive leads for the turn controls and the turn controls are effective in the manner already described. It will be noted, however, that each wire 156 and 161 has circuit extended to one of the contacts E166 associated with the "center" actuator E165, and when the switch arm of the latter bridges contacts E166 then circuit from wire E156 (left) or E161—167 (right) is extended to a wire E250 which is connected to the other one of the contacts E166. Wire E250 now becomes the positive lead for the turn controls rather than wire E95, and this wire is associated with important limit switches.

Thus, wire E250 becomes the positive lead for the turn controls when it is desired to automatically re-center the platform from an extended position. Wire E250 terminates at a contact E251 of a limit switch LS2 which has another limit switch working in unison therewith as will be described. Limit switch LS2 is "closed" to engage contact E251 in all positions of the platform except its centered or zero rotative position directly over the mast. Therefore, this limit switch (see FIG. 14) can be located at the top of the lift head relative to which the platform can turn through 360°, and can be controlled conveniently by a cam LSC, FIG. 14, complementally located at the base of the platform which turns with the platform. Therefore, so long as the platform is not centered over the mast, switch LS2 will extend circuit to a wire E253 which leads to contact E6 of the ignition switch, thereby completing the positive lead for the turn controls, but this time through switch LS2 when the platform "center" switch is being used in conjunction with the platform "left" or platform "right" switch. Now, as the platform reaches its centered position, switch LS2 is opened by its cam complement on the platform thereby interrupting flow of current to the turn control solenoid E214 or E215 and the platform is stopped in an automatically centered position.

Thus, as the platform is centered in this manner, switch LS2 is "opened" to engage a contact E255 which is in an optional circuit. This circuit includes wires E256—7, a limit switch LS3, and a wire E260 from "live" contact E261 of switch LS3 to the coil of relay 263 having an armature which carries switches E225A and E235A. LS3 if used is so located as to engage contact E261 only if the platform is lowered below the top of the mast in a centered position, thereby causing switches E225A and E235A to open to prevent the turn motor from being energized. It should be mentioned that this condition prevails only so long as the mast sticks through the trap door. When the platform is clear of the mast, switch LS3 is on its "dead" contact, and the platform can be turned. Switch LS3 is, therefore, located accordingly and on one side of the mast assembly near the top thereof to be engageable by a complementing switch operating part at the bottom of the platform. This is important in order that the platform can in fact be turned through 180° of arc even if completely lowered, provided the platform is at the proper side of the mast as will be explained. In view of this, it should be mentioned that switch LS3 is by no means essential and can be advantageously eliminated, since it has already been explained that if the platform encounters an obstacle during turning, the belt used to drive the platform turn shaft will slip under such circumstances.

PLATFORM—LOWER

The platform is lowered simply by opening a valve DV, FIG. 21, which connects the cylinders for the mast elevating pistons to drain. It will be noted that this valve is solenoid controlled, and the solenoid is indicated at SOL3 in FIGS. 21 and 23. Valve DV can also be opened manually by a button MB, FIG. 21, in an emergency in the event of a power failure at a time when the platform is raised.

Solenoid SOL 3, FIG. 23, is grounded on one side and the other side is connected to a wire E270 which leads to a limit switch LS4 which can be operated simultaneously with switch LS3. If the latter is not used, switch LS4 will alone be located on the mast in the position shown in FIG. 3 to be reversed when the lift head has raised the platform to be free of the mast. When LS4 reverses, it moves from a contact E272, FIG. 23, to a contact E273. LS3, will at the same time, if it is used, be moved off contact E260.

The contacts E272 and E273 of the limit switch LS4 are respectively connected to wires E275 and E276, and these wires in turn are extended to respective collector rings. Related wires E275' and E276' are extended to respective contacts E277 and E278 of a cam-controlled limit switch LS5. The cam for controlling this limit switch will be described below in connection with certain positions of the platform, and for the present it is sufficient to continue only with the manner in which solenoid SOL3 can be energized under one condition to permit lowering of the platform.

Thus, if the platform is raised but not to an extent to be free of the mast, (LS4 on E272) circuit for solenoid SOL3 will be extended from contact E277 to a wire E280 connected thereto. Thus, wire E280 leads from contact E277 to one of a pair of contacts E286 associated with the actuator E290 for the platform "lower" switch. Hence it will be seen that if the conditions thus far prevail, the contacts E286 will be bridged when switch actuator E290 is closed thereon. This further extends circuit for the solenoid SOL3 to a wire E291 which is connected to a normally open foot operated switch E295. This switch is located on the platform near the sink at a point well remote from the trap door so that it will be assured that the platform can be lowered only if the operator is in this remote working position away from the trap door through which the mast will enter. By closing switch E295, circuit for solenoid SOL3 is further extended through wires E83 and E95 to switch E99 and from thence to wire E8 which represents a positive lead through the ignition switch E9 if the latter is closed thereby completing the circuit for solenoid SOL3.

It will therefore be recognized that the platform can be lowered only if the vehicle is not in motion. At the same time, circuit will be completed to a relay E300 which has one side of its coil grounded and the other side connected by a wire E301 to wire E280. When the coil for relay E300 is thus energized, its armature is effective as a switch to bridge related contacts E304. One of the contacts E304 is connected by a wire E305 to wire E253 which is in the ignition circuit. The other of contacts E304 is connected to the circuit of bell EB, and accordingly circuit will be completed to the bell EB to sound a warning signal that the platform is being lowered.

When the platform is elevated to clear the top of the mast, it has been explained that switch LS4 will reverse to be on contact E273. Accordingly, under such circumstances the circuit for solenoids SOL3 will now include wire E276 rather than wire E275. Wire E276 is connected to contact E278 of switch LS5. A wire E310 is extended therefrom to the switch arm of a limit switch LS6. Switch LS6 is connected to switch LS2 to operate in unison therewith, such that switch LS6 will be on its "live" contact E311 when the platform is centered in a zero rotative position over the mast. A wire E312 is extended from contact E311 to contact E277. Hence, if the platform is above the mast but is at the same time centered, it can be lowered by engaging switches E290 and E295 as above described, and the mast can come through the trap door opening if the platform is lowered that far.

Even if the platform is not centered directly over the top of the mast in a zero rotative position (see FIG. 24) the platform can nevertheless be lowered provided it clears the side of the mast where the lift head is located as shown in FIG. 25. FIGS. 24 and 25 will be discussed in more detail below under a separate heading.

Thus, if the platform is not centered in a zero position directly over the top of the mast in condition to have the mast extended through the trap door opening in centered relation thereto, switch LS6 will not be on contact E311, but the platform can be lowered nevertheless if it has been swung to be on the opposite side of the mast. Such permissive lowering under this condition involves limit switch LS5. Switch LS5 is controlled by a cam LSC2, FIGS. 15 and 15A, which is mounted on a sleeve which turns with the platform. This cam has a 180° lobe effective to engage switch LS5 to hold its switch arm on contact E278 so long as the platform clears the side of the mast where the lift head is located, that is, so long as the platform is within quadrants II and III, FIG. 25, of its turn circle as indicated in FIG. 25. Consequently, with switch LS4 on contact E273, and switch LS5 held on contact E278 by its cam controller LSC2, circuit for solenoid SOL3 will run to contact E277 thereby shunting the now open switch LS6 (platform not centered). Of course the platform may be lowered under this circumstance to the point where switch LS4 is moved back to contact E272, but this is an instantaneous action. However, if cam LSC2 is presenting its 180° dwell to switch LS5 (platform in quadrants I and II and does not clear the opposite side of mast) switch LS5 will be on its "dead" contact as shown in FIG. 23, and if the platform is not centered (switch LS6 on its "dead" contact) then circuit cannot be completed to solenoid SOL3.

FIGS. 24 AND 25

The possible rotative conditions of the platform are shown in FIGS. 24 and 25. In FIG. 24, the platform 32 is shown as raised by the lift head 36 to a point where the floor of the platform is in a plane spaced from the top plane of the mast 35. In this position, the platform can be turned 360° in any direction through four quadrants, and FIG. 24 serves to clearly show the cantilever relation of the platform relative to the lift head and the extent to which the rotative axis of the platform on the lift head is considerably eccentric to the vertical axis of the mast. The dotted line OR position of the platform is its zero rotative position, and when so positioned the trap door opening or mast-clearance area of the platform is directly over the mast, whereby the platform can be lowered to nest on the mast.

Dotted line positions DR1 and DR2 in FIG. 24 are positions where the platform is displaced in either direction from its zero or non-centered position, in which event switches LS2 and LS6 are off related contacts E255 and E311. This displacement will occur within several degrees of the zero position, since some allowance has to be made for the inertia of the platform as it swings into its centered or zero position. Therefore, if the platform is displaced from its zero position and is within quadrants I or IV of its swinging arc (FIG. 25) the platform cannot be lowered but it can be swung 360° in either direction if clear of the top of the mast.

In FIG. 25 (top) the platform is shown in full lines free of the mast, and hence free to swing 360° into and out of any quadrant. However, if the platform is on the proper side of the mast and is lowered to a point where the floor thereof is no longer displaced above the top of the mast, the platform can only swing with its longitudinal axis in quadrants II and III, which is to say the longitudinal axis of the platform cannot appreciably enter quadrants I and IV since the platform is blocked off therefrom by the interferring mast. It will therefore be appreciated that, to assure these possibilities, the width of the platform is about one-half the distance that the rotative axis of the platform is displaced from the adjacent side of the mast with a slight difference to assure free 180° turning from one 90° position to the other as shown in FIG. 25. As a consequence of this difference, the outermost point on the platform could enter quadrants I and IV say for several degrees.

HYDRAULIC CIRCUIT—FIGS. 21 and 22

The hydraulic circuit for raising and lowering the lift rams 221 and 231 is illustrated with conventional JIC symbols in FIG. 21. The hydraulic drive for the vehicle is likewise illustrated with conventional JIC symbols in FIG. 22.

Referring to FIG. 21, the motor M drives the hydraulic pump P, and the source of fluid is the tank or reservoir 245. A by-pass spring-loaded maximum pressure valve MV shunts the pump P, and this valve is set to open to communicate with the tank 245 in the event the platform carries more than a four-hundred pound load exclusive of the normal equipment carried thereby. The outlet conduit 246 from the pump P has a check valve CVI interposed therein to prevent back-flow through the pump P, and an air cushioned cylinder AC1 is arranged to communicate with the conduit 246. This air cylinder and those to be described hereinafter are in the nature of accumulators and assure even and uniform flow of the hydraulic fluid.

The pressure supply line further includes a check valve CV2 which will open to admit fluid under pressure into cylinder 220, and this valve is shunted by a restrictor RT1 set to establish a slow "down" speed of the ram 221 when the platform is lowered.

Conduit 243 is branched at 244 to furnish fluid under pressure to cylinder 230. A mechanical shut-off valve MS is interposed in conduit 244 ahead of cylinder 230. This valve, as indicated by the dashed line between it and ram 221, is arranged in a known fashion to be closed when ram 221 is elevated its maximum distance to thereby prevent ram 231 from lowering first, assuming both rams to be elevated. Further conduit 244 has a check valve CV3 and a shunting restrictor RT2 arranged therein as described above for cylinder 220.

Inasmuch as ram 221 carries less weight than ram 231, ram 221 will be the first to raise when pump P is set in operation. When ram 221 has been raised its maximum height, with pump P still in operation, fluid under pressure in line 244 will then flow to cylinder 230 through valves MS and CV3, causing ram 231 to raise. The electrical circuit for pump P has been described above as including the manual switch E80.

Lowering of the rams is under control of solenoid SOL3 which when energized will open valve DV, FIG. 21, to connect the hydraulic drain line DL for the cylinders to the reservoir 245. Valve DV can also be opened under control of a manual push button MB which should only be used if the platform is centered. As was explained, if both rams are raised, ram 221 will lower first to the point where it opens valve MS, whereupon ram 231 is free to lower. Both cylinders drain through the restrictors RT1 and RT2.

The circuit for the hydraulic drive is illustrated in FIG. 22 as inclusive of the hydraulic motor HM and its output drive shaft 120. Operating fluid under pressure can be delivered to the motor HM through the conduit 116 and this conduit is also illustrated in FIG. 18. Further, assuming operating fluid to be flowing in conduit 116 to the right as viewed in FIG. 22 to drive the shaft 120 in one direction, the operating fluid is returned to reservoir 115 through conduit 117 as will be explained. The motor HM is reversible and hence this directional flow is adapted to be reversed. Advantageously, air cushioned cylinders AC2 and AC3 are arranged to add pressure to the hydraulic fluid in conduits 116 and 117 to assure even and uniform flow of hydraulic fluid therein.

The direction of fluid in the conduits 116 and 117 is determined by the setting of a spring-centered solenoid controlled four-way valve as illustrated by the standard JIC symbol in FIG. 22. The controlling solenoids are identified at SOL1 and SOL2, and the operation and control of these solenoids has been described above in connection with FIG. 23. Thus, when solenoid SOL1 is energized to shift the spool of the four-way valve to the right as viewed in FIG. 22, fluid under pressure is adapted to flow from the main supply line or conduit FL, FIG. 22, into conduit 116, and at this time conduit 117 will be connected to the reservoir 115. Conversely, when solenoid SOL2 is energized, fluid under pressure flows through conduit 117 to drive the motor HM in the opposite direction, and at this time conduit 116 becomes the return line connected to the reservoir 115 through the four-way valve.

The motor HM can be driven at a slow speed by setting in operation pump P1 alone or can be driven at a fast speed by operating pumps P1 and P2 simultaneously as has been explained above. In each instance, fluid is pumped from the reservoir through a check valve CV5 or CV6, and the pumps are shunted by pre-set pressure responsive by-pass valves BP1 and BP2 which will open at pressures predetermined as the desired maximum slow speed or fast speed for the vehicle.

CONCLUSION

It will be seen from the foregoing that the over-head service vehicle of the present invention is one that can be easily steered and moved about confining areas especially in view of the way in which the mast, the lift elements and the platform are arranged over the base of the unit.

The platform is in effect cantilevered with respect to the main supporting mast, and in fact the turning axis of the platform is such as to afford a wide sweep through 360° of arc when clear of the mast. Even if the platform is lowered down the side of the mast where the lift head is located, the platform is capable of a 180° turn.

Fresh water can be pumped up to a sink on the platform at any elevated or rotative position of the platform, and used water can be drained from a sink at any elevated or rotative position of the platform. This is highly advantageous, since it is not necessary to maintain the platform in any particular position incidental to draining a sink or replenishing a sink with clean water.

The vehicle derives all its power requirements from a battery EB, though hydraulic fluid is used in many instances for impelling hydraulic motors. The electrical control circuit embodies safety features including preventing the vehicle from being moved when the platform is raised, preventing the platform from being raised when the vehicle is on a particularly unlevel surface, and preventing the platform from being lowered when the major extent of the platform is in quadrant I or IV in a non-centered position with respect to the mast.

Hence, while I have illustrated and described preferred embodiments of my invention it is to be understood that these are capable of variation and modification, and I therefore do not wish to be limited to the precise details set forth, but desire to avail myself of such changes and alterations as fall within the purview of the following claims.

I claim:

1. An over-head service vehicle comprising a base, a mast anchored to the base, lift means supported by said mast for vertical up and down movement relative thereto, a non-rotatable lift head carried by said lift means, a platform carried by said lift head and having a floor on which a workman can stand, said platform being supported on the lift head for turning movement about a vertical axis, a fresh water supply tank and a receiver tank for used water both carried by said base, a sink and a fresh water outlet therefor carried by said platform, an extensible supply line in communication with said supply tank on the base and connected to said outlet whereby fresh water can be furnished for the sink at any elevated position of the platform, and an extensible drain line for said sink and being in communication with said receiver whereby the sink can be drained at any elevated position of the platform.

2. An over-head service vehicle comprising a base, a mast anchored to the base, lift means supported by said mast for vertical up and down movement relative thereto, a non-rotatable lift head carried by said lift means, a platform carried by said lift head and having a floor on which a workman can stand, said platform being supported on the lift head for turning movement about a vertical axis, a fresh water supply tank and a receiver tank for used water both carried by said base, a sink and a fresh water outlet therefore carried by said platform, a supply line in communication with said supply tank and including a flexible and extensible section, said supply line including a section extending through said lift head substantially concentric to the axis of rotation of said platform and being connected to said outlet whereby fresh water can be furnished for the sink at any elevated and rotative position of the platform, a substantially straight extensible drain line comprising extensible telescoped tubes and being in communication at one end with said receiver tank, said drain line communicating at its other end with a water sump supported by said lift head below the sink and whereby the sink can be drained at any elevated and rotative position of the platform.

3. An over-head service vehicle comprising a base, a mast anchored to the base, lift means supported by said mast for vertical up and down movement relative thereto, a non-rotatable lift head carried by said lift means, an upright bearing support secured to the lift head, a platform disposed over said lift head and having a floor on which a workman can stand, said platform being mounted on said bearing support for turning movement thereabout, a fresh water supply tank and a used water receiver tank both carried by said base, a sink and a fresh water outlet therefor carried by said platform, said sink being located adjacent the axis of rotation of said platform, an extensible hose wound on a reel on said base, said hose having one end in communication with said supply tank and being in communication at its other end with said outlet whereby the hose will be unreeled during the upward movement of the platform to enable fresh water to be furnished for the sink at any elevated and rotative position of the platform, a sump for used water mounted on the lift head beneath the platform and the drain of said sink being connected thereto, a vertically oriented extensible drain line for said sink and comprising straight telescoped tubes arranged parallel to said mast, one end of said drain line being in communication with the receiver tank and the other end of the drain line being in communication with the sump whereby the sink can be submitted to a direct gravity drain at any elevated and rotative position of the platform, a pump for pumping water through the hose and having an operating switch on the platform adjacent said sink, and a pump for pumping used water from the receiving tank therefor.

4. An over-head service vehicle comprising a mobile and steerable base, drive means for imparting forward motion to the base, a substantially upright mast anchored to said base and having opposed sides, lift means supported by said mast for vertical up and down movement relative thereto, a lift head carried by said lift means and located at one side of said mast, a platform carried by said lift head and movable vertically with the lift head from a lowered position below the top of the mast to an elevated position above the top of the mast, said platform having a floor on which a worker can stand, said platform being rotatably supported at one end by the lift head for turning movement through more than 180° of arc about a vertical axis so as to be positionable alternatively with its opposite end in an extended position beyond either of said opposed sides of the mast, said floor having a clearance area defining a centered position of the platform relative to said mast and through which the mast is projected with the platform lowered down over the mast in a centered position, and manually controllable turn means for so turning the platform when the platform is in such an elevated position free of the top of the mast.

5. A vehicle according to claim 4 wherein means are provided for automatically stopping turning movement of the platform in a centered zero position with said clearance area centered directly over the top of the mast and in alignment therewith.

6. A vehicle according to claim 4 wherein control means responsive to setting the vehicle in motion are provided to prevent raising, lowering and turning of the platform when the vehicle is in motion.

7. A vehicle according to claim 6 wherein control means responsive to a predetermined tilt of the base from horizontal are effective to prevent the platform from being raised when the base is so tilted.

8. A vehicle according to claim 4 wherein the vehicle has selective multiple-speed drive means including a slow and fast speed drive, and wherein automatically operable control means are responsive to raising of the platform above a predetermined level to disable the fast speed drive.

9. An over-head service vehicle comprising a base, an elongated substantially upright mast anchored to the base, lift means supported by said mast for vertical up and down movement relative thereto, a non-rotatable lift head carried by said lift means, a platform carried by said lift head and having a floor on which a workman can stand, said platform being supported in a cantilevered rotation on the lift head for turning movement about a vertical axis which is eccentric to the longitudinal axis of said mast, a fresh water supply tank and a receiver tank for used water both carried by said base, a sink and a fresh water outlet therefor carried by said platform, an extensible supply line in communication with said supply tank on the base and including a flexible section, said supply line including a section extending through the lift head and connected to said fresh water outlet in part by a swivel joint whereby fresh water can be furnished for the sink at any elevated and rotative position of the platform, a sump for said sink and mounted on the lift head to be independent of rotative movement of the platform, a drain line from the drain of the sink to said sump, and an extensible drain line in communication with said receiver tank and with said sump whereby the sink can be drained at any elevated position of the platform, said extensible drain line extending parallel to said mast.

10. A vehicle according to claim 9 wherein respective pumps for said tanks are mounted on the base and enable fresh water to be pumped to the sink and used water to be pumped from its tank, and wherein the pump for fresh water is operable through a manually controlled switch on said platform adjacent said sink.

11. An over-head service vehicle comprising a mobile and steerable base, a drive motor for imparting forward and reverse motion to the base, a substantially upright mast anchored to said base and having opposed sides, lift means supported by said mast for vertical up and down movement relative thereto, a lift head carried by said lift means and located at one side of said mast, a platform carried by said lift head and movable vertically with the lift head from a lowered position below the top of the mast to an elevated position above the top of the mast, said platform having a floor on which a worker can stand, said platform being rotatably supported at one end by the lift head from turning movement through more than 180° of arc about a vertical axis so as to be positionable alternatively with its opposite end in an extended position beyond either of said opposed sides of the mast, said floor having a clearance area defining a centered position of the platform relative to said mast and through which the mast can project thereby enabling the platform to be lowered down over the mast in a centered position, a turn motor for the platform and being mounted on the lift head, control switches for said motors located on said platform, and means to prevent the platform from being raised when the vehicle is in motion.

12. An over-head service vehicle comprising a mobile and steerable base, a drive motor on the base for imparting forward and reverse motion to the base, a substantially upright elevated mast anchored to said base and having opposed sides, hydraulically operable lift means supported by said mast for vertical up and down movement relative thereto, a non-rotatable lift head carried by said lift means and located at one side of said mast, a platform carried by said lift head and movable vertically with the lift head from a lowered position below the top of the mast to an elevated position above the top of the mast, said platform having a floor on which a worker can stand, said platform being rotatably supported in a cantilevered rotation at one end by the lift head for turning movement through more than 180° of arc about a vertical axis eccentric to the longitudinal axis of the mast so as to be positionable alternatively with the opposite end of the platform in an extended position beyond either of said opposed sides of the mast, said floor having a clearance area defining a centered position of the platform relative to said mast and through which the mast is projected with the platform lowered down over the mast in a centered position, and said platform being positioned on the lift head so as to be turnable when the platform is below the top of the mast in a position removed 180° from its centered position.

13. A vehicle according to claim 12 wherein the platform is turned by a motor mounted on the lift head.

14. An over-head service vehicle comprising a mobile and steerable base, drive means for imparting forward motion to the base, a substantially upright elongated mast anchored to said base and having opposed sides, lift means supported by said mast for vertical up and down movement relative thereto, a lift head carried by said lift means and located at one side of said mast, a platform carried by said lift head and movable vertically with the lift head from a lowered position below the top of the mast to an elevated position above the top of the mast, said platform having a wash sink and an outlet and a drain therefor, said platform having a floor on which a worker can stand, said platform being rotatably supported in a cantilevered relation at one end by the lift head for turning movement through more than 180° of arc about a vertical axis eccentric to the longitudinal axis of the mast so as to be positionable alternatively with the opposite end of the platform in an extended position beyond either of said opposed sides of the mast, said floor having a clearance area defining a centered position of the platform relative to said mast and through which the mast can project thereby enabling the platform to be lowered down over the mast in a centered position, said platform being positioned on the lift head so as to be turnable when the platform is below the top of the mast in a position removed 180° from its centered position, an extensible supply line for supplying fresh water to said sink, an extensible drain line for draining used water from said sink, said supply line being in communication with said water outlet at all vertical and rotative positions of the platform, said drain line being connected to a sump carried by said lift head, and said sump being connected to the drain of the sink at all vertical and rotative positions of the platform.

15. An over-head service vehicle comprising a base, a mast anchored to the base, lift means supported by said mast for vertical up and down movement relative thereto, a non-rotatable lift head carried by said lift means, a platform carried by said lift head and having a floor on which a workman can stand, said platform being supported on the lift head for turning movement about a vertical axis, a fresh water supply tank and a receiver tank for used water both carried by said base, a sink having a drain and a fresh water outlet for the sink carried by said platform, a supply line in communication with said supply tank, said supply line including a flexible and extensible section, said supply line including a section extending through said lift head substantially concentric to the axis of rotation of said platform and having a swivel connection to said outlet whereby fresh water can be furnished for the sink at any elevated and rotative position of the platform, a substantially straight extensible drain line comprising extensible telescoped tubes and being in communication at one end with said receiver tank, said drain line communicating at its other end with a water sump supported in a fixed position on said lift head, and another drain line connected to the drain of the sink and draining into said sump.

16. An over-head service vehicle comprising a base, a mast anchored to the base, lift means supported by said mast for vertical up and down movement relative thereto, a non-rotatable lift head carried by said lift means, a platform carried by said lift head and having a floor on which a workman can stand, said platform being supported on the lift head for turning movement about a vertical axis, a fresh water supply tank and a receiver tank for used water both carried by said base, a sink and a fresh water outlet therefor and a drain therefor carried by the said platform, an extensible supply line for supplying fresh water to said sink, an extensible drain line for draining used water from said sink, said supply line being in communication with said fresh water outlet at all vertical and rotative positions of the platform, said drain line being connected to a sump carried by said lift head, and said sump being connected to the drain of the sink at all vertical and rotative positions of the platform.

17. An over-head service vehicle comprising a movable base, a substantially upright mast anchored to said base and having opposed sides, vertically movable lift means and actuatable means therefor supported by said mast, a lift head carried by said lift means and disposed at one side of the mast, an elongated platform of predetermined length and width carried by said lift head and including a floor to be movable vertically with the lift head from a retracted position below the top of the mast to an elevated position clear of the top of the mast, said platform being supported on a rotative axis at one end by the lift head and free to turn through 360° of arc in either direction when so elevated, said turning arc including a zero position whereat the major extent of the longitudinal axis of the platform is extended outward of the side of the mast opposite the side where the lift head is located and in alignment with the lift head, said turning arc including a 180° position whereat the major extent of the longitudinal axis of the platform is extended outward of the side of the mast where the lift head is located and in alignment with the lift head, and said rotative axis being displaced from the adjacent side of the mast at least equal to about half the width of the platform to permit substantially 90° turning of the platform in either direction when the platform is below the top of the mast in its 180° position.

18. An over-head service vehicle comprising a movable base, a substantially upright mast anchored to said base and having opposed sides, a vertically movable lift head, means for raising and lowering said lift head, an elongated platform of predetermined length and width carried by said lift head and including a floor to be movable vertically with the lift head from a retracted position below the top of the mast to an elevated position clear of the top of the mast, said platform being supported on a rotative axis at one end by the lift head and free to turn through 360° of arc in either direction when so elevated, said turning arc including a zero position whereat the major extent of the longitudinal axis of the platform is extended outward of the side of the mast opposite the side where the lift head is located and in alignment with the lift head, said turning arc including a 180° position whereat the major extent of the longitudinal axis of the platform is extended outward of the side of the mast where the lift head is located and in alignment with the lift head, and said rotative axis being displaced from the adjacent side of the mast at least equal to about half the width of the platform to permit substantially 90° turning of the platform in either direction when the platform is below the top of the mast in its 180° position.

19. An over-head service vehicle comprising a movable base, a substantially upright mast anchored to said base and having opposed sides, a vertically movable lift head disposed at one side of the mast, means for raising and lowering said lift head, an elongated platform of predetermined length and width carried by said lift head and including a floor to be movable vertically with the lift head from a retracted position below the top of the mast to an elevated position clear of the top of the mast, said platform being supported on a rotative axis at one end by the lift head and free to turn through 360° of arc in either direction when elevated sufficiently to have said floor clear of the top of the mast, said turning arc including a zero position whereat the major extent of the longitudinal axis of the platform is extended outward of the side of the mast opposite the side where the lift head is located and in alignment with the lift head, said zero position being further defined by a clearance area in the floor of the platform being centered with respect to the mast to enable the platform to be lowered down over the mast with the mast sticking through said clearance area, said turning arc also including a 180° position whereat the major extent of the longitudinal axis of the platform is extended outward of the side of the mast where the lift head is located and in alignment with the lift head, said clearance area being displaced from the mast in said 180° position, and said rotative axis being displaced from the adjacent side of the mast at least equal to about half the width of the platform to permit substantially 90° turning of the platform in either direction when the platform is below the top of the mast in its 180° position.

20. An over-head service vehicle comprising a movable base, a substantially upright mast anchored to said base and having opposed sides, vertically movable lift means and actuatable means therefor supported by said mast, a lift head carried by said lift means and disposed at one side of the mast, an elognated platform of predetermined length and width carried by said lift head and including a floor to be movable vertically with the lift head from a retracted position below the top of the mast to an elevated position clear of the top of the mast, supply and receiver tanks respectively for fresh and used water carried by said base, a sink and a fresh water outlet and a drain therefor carried by said platform, a sump carried by said lift head and said sump being connected to the drain of the sink to receive used water therefrom, an extensible supply line in communication with said supply tank and extending through said lift head and having a swivel connection to said fresh water outlet, an extensible drain line including telescoped tubes in communication with said receiver tank and with said sump, said platform being supported on a rotative axis at one end by the lift head and free to turn through 360° of arc in either direction when so elevated, said turning arc including a zero position whereat the major extent of the longitudinal axis of the platform is extended outward of the side of the mast opposite the side where the lift head is located and in alignment with the lift head, said turning arc including a 180° position whereat the major extent of the longitudinal axis of the platform is extended outward of the side of the mast where the lift head is located and in alignment with the lift head, and said rotative axis being displaced from the adjacent side of the mast at least equal to about half the width of the platform to permit substantially 90° turning of the platform in either direction when the platform is below the top of the mast in its 180° position.

21. An over-head service vehicle comprising a movable base, a substantially upright mast anchored to said base and having opposed sides, a vertically movable lift head disposed at one side of the mast, means for raising and lowering said lift head, an elongated platform of predetermined length and width carried by said lift head and including a floor to be movable vertically with the lift head from a retracted position below the top of the mast to an elevated position clear of the top of the mast, a sink and a fresh water outlet and a drain therefor carried by said platform, means for supplying fresh water to said outlet including an extensible supply line extended from said base and terminating in a swivel connection to said outlet, means connected to the drain of the sink and including a sump carried by said lift head and an extensible drain line extended from said sump to said base, said platform being supported on a rotative axis at one end by the lift head and free to turn through 360° of arc in either direction when so elevated, said turning arc including a zero position whereat the major extent of the longitudinal axis of the platform is extended outward of the side of the mast opposite the side where the lift head is located and in alignment with the lift head, said turning arc including 180° position whereat the major extent of the longitudinal axis of the platform is extended outward of the side of the mast where the lift head is located and in alignment with the lift head, and said rotative axis being displaced from the adjacent side of the mast at least equal to about half the width of the platform to permit substantially 90° turning of the platform in either direction when the platform is below the top of the mast in its 180° position.

22. An over-head service vehicle comprising a mobile and steerable base, a substantially upright mast anchored to the base, lift means supported by said mast for vertical up and down movement relative thereto, a non-rotatable lift head carried by said lift means, a platform carried by said lift head and having a floor on which a workman can stand, said platform being supported on the lift head for turning movement about a vertical axis, a sink and a fresh water outlet therefor and a drain therefor carried by said platform, means for supplying fresh water to said outlet including an extensible supply line extended from said base and joined to said outlet by means including a swivel connection, and means connected to the drain of the sink and including a sump carried by said lift head, and an extensible drain line extended from said sump to said base.

23. An over-head service vehicle comprising a mobile and steerable base, a substantially upright mast anchored to the base, lift means supported by said mast for vertical up and down movement relative thereto, a non-rotatable lift head carried by said lift means, a platform carried by said lift head and having a floor on which a workman can stand, said platform being supported on the lift head for turning movement about a vertical axis, a fresh water supply tank and a receiver tank for used water both carried by said base, a sink and a fresh water outlet and a drain therefor carried by said platform, means for supplying fresh water to said outlet and including an extensible hose in communication with said supply tank, said fresh water supply means extending through the lift head substantially concentric to said axis and terminating in a swivel connection to said outlet, and means connected to the drain of the sink and including a sump carried by said lift head and an extensible drain line comprising a plurality of telescoped tubes extended from said receiver tank to said sump.

References Cited in the file of this patent
UNITED STATES PATENTS

| | | |
|---|---|---|
| 596,676 | Ford | Jan. 4, 1898 |
| 1,139,313 | Stevens | May 11, 1915 |
| 2,035,294 | Black | Mar. 24, 1936 |
| 2,204,671 | Erickson | June 18, 1940 |
| 2,446,693 | Davis | Aug. 10, 1948 |
| 2,646,807 | Martin | July 28, 1953 |
| 2,787,278 | Mitchell | Apr. 2, 1957 |